(12) United States Patent
Luo et al.

(10) Patent No.: US 9,209,932 B2
(45) Date of Patent: Dec. 8, 2015

(54) CQI-ONLY TRANSMISSION ON THE PUSCH

(75) Inventors: Xiliang Luo, Cardiff, CA (US); Peter Gaal, San Diego, CA (US); Wanshi Chen, San Diego, CA (US); Juan Montojo, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 685 days.

(21) Appl. No.: 13/290,328

(22) Filed: Nov. 7, 2011

(65) Prior Publication Data

US 2012/0113849 A1    May 10, 2012

Related U.S. Application Data

(60) Provisional application No. 61/411,345, filed on Nov. 8, 2010.

(51) Int. Cl.
*H04L 1/00* (2006.01)
*H04L 1/06* (2006.01)

(52) U.S. Cl.
CPC ............ *H04L 1/0025* (2013.01); *H04L 1/0026* (2013.01); *H04L 1/0027* (2013.01); *H04L 1/06* (2013.01)

(58) Field of Classification Search
CPC ....... H04L 1/0025; H04L 1/06; H04L 1/0027; H04L 1/0026; H04L 1/0007; H04L 1/1819; H04L 1/0029; H04L 1/0003; H04L 1/0031; H04L 1/1607; H04L 1/1671; H04L 5/0023; H04L 5/0035; H04L 5/0053; H04W 74/02; H04W 72/0406; H04W 72/085; H04W 72/0413; H04W 48/08; H04W 16/28; H04W 52/146; H04B 7/024; H04B 7/0417; H04B 7/063; H04B 7/0452; H04B 7/0623; H04B 7/0626; H04B 7/0639

See application file for complete search history.

(56) References Cited

U.S. PATENT DOCUMENTS

| 8,509,168 | B2 | 8/2013 | Kim et al. |
| 2009/0069810 | A1 | 3/2009 | Kuroda et al. |
| 2010/0091678 | A1 | 4/2010 | Chen et al. |
| 2010/0281333 | A1* | 11/2010 | Jongren et al. ................. 714/752 |
| 2011/0103247 | A1 | 5/2011 | Chen et al. |
| 2011/0103335 | A1 | 5/2011 | Golitschek Edler Von Elbwart et al. |
| 2011/0243079 | A1* | 10/2011 | Chen et al. .................... 370/329 |

(Continued)

FOREIGN PATENT DOCUMENTS

| EP | 2117155 A1 | 11/2009 |
| JP | 2011510592 A | 3/2011 |

(Continued)

OTHER PUBLICATIONS

Qualcomm, "UCI Transmission Enhancements," 3GPP TSG-RAN WG1 #66, R1-112552, Athens, Greece, Aug. 22-26, 2011.

(Continued)

*Primary Examiner* — Yee Lam
(74) *Attorney, Agent, or Firm* — Austin Rapp & Hardman

(57) ABSTRACT

A method for transmitting a channel quality indicator-only feedback payload is described. A channel quality indicator scheduling message is received from a base station. A channel quality indicator-only feedback payload is generated. The channel quality indicator-only feedback payload is transmitted on a physical uplink shared channel. The method may be performed by a wireless communication device.

39 Claims, 11 Drawing Sheets

(56) References Cited

U.S. PATENT DOCUMENTS

| | | | | |
|---|---|---|---|---|
| 2011/0249578 | A1* | 10/2011 | Nayeb Nazar et al. | 370/252 |
| 2011/0299484 | A1* | 12/2011 | Nam et al. | 370/329 |
| 2013/0182789 | A1* | 7/2013 | Ko et al. | 375/267 |
| 2013/0188591 | A1* | 7/2013 | Ko et al. | 370/329 |

FOREIGN PATENT DOCUMENTS

| | | | |
|---|---|---|---|
| JP | 2011521543 A | 7/2011 | |
| WO | WO-2009096757 A2 | 8/2009 | |
| WO | WO-2009128285 A1 | 10/2009 | |
| WO | WO-2009135574 A1 | 11/2009 | |
| WO | WO-2010089825 A1 | 8/2010 | |

OTHER PUBLICATIONS

Samsung, "Remaining Details on CQI only Transmissions for DCI format 4," 3GPP TSG RAN WG1 #64, R1-110738, Taipei, Taiwan, Feb. 21-25, 2011.

International Search Report and Written Opinion—PCT/US2011/059768—ISA/EPO—Dec. 28, 2011.

NEC Group: "Views on UL transmission modes for PUSCH and signaling", 3GPP Draft; R1-105416-UL TX Modes, 3Rd Generation Partnership Project (3GPP), Mobile Competence Centre ; 650, Route Des Lucioles ; F-06921 Sophia-Antipolis Cedex; France, vol. RAN WG1, No. Xi'an; 20101011, Oct. 5, 2010, XP050450554, [retrieved on Oct. 5, 2010], p. 1, paragraph 2.1, p. 2, paragraph 2.2, p. 6, paragraph "aperiodic CQI only transmission".

Qualcomm Incorporated: "CQI Only Transmission on PUSCH", 3GPP Draft; R1-106368 CQI Only TXMN on PUSCH, 3rd Generation Partnership Project (3GPP), Mobile Competence Centre ; 650, Route Des Lucioles ; F-06921 Sophia-Anti Polis Cedex ; France, vol. RAN WG1, No. Jacksonville, USA; 20101115, Nov. 9, 2010, XP050489739, [retrieved on Nov. 9, 2010] the whole document.

Samsung: "Further Discussions on UL MIMO Signaling requirements" , 3GPP Draft; R1-105766-UL MIMO SIG R, 3rd Generation Partnershi P Project (3GPP), Mobile Competence Centre ; 650, Route Des Lucioles ; F-06921 Sophia-Anti Polis Cedex; France, vol. RAN WG1, No. Xi'an; 20101011, Oct. 14, 2010, XP050462867, [retrieved on Oct. 14, 2010] p. 4.

Texas Instruments: "Remaining Issues on UL MIMO Transmission Mode and DCI Format Design", 3GPP Draft; R1-104479 TI UL MIMO DCI, 3rd Generation Partnership Project (3GPP), Mobile Competence Centre ; 650, Route Des Lucioles ; F-06921 Sophia-Antipolis Cedex; France, vol. RAN WG1, No. Madrid, Spain; 20100823, Aug. 17, 2010, XP050449800, [retrieved on Aug. 17, 2010] p. 1, paragraph 1, p. 2, paragraph 3, p. 3, paragraph before "Recommendation" at the bottom of the page-p. 4, paragraph 4.

Nortel: "Open issues on TBS signaling", 3GPP Draft; R1-082513 (Nortel-TBS_Signaling), 3rd Generation Partnership Project (3GPP), Mobile Competence Centre; 650, Route Des Lucioles; F-06921 Sophia-Antipolis Cedex; France, vol. RAN WG1, No. Warsaw, Poland; 20080625, Jun. 25, 2008, XP050110778, pp. 1-2, [retrieved on Jun. 25, 2008].

Qualcomm Incorporated: "UL trasmission modes and grants for MIMO transmissions", 3GPP Draft; R1-102760 UL Trasmission Modes and Grants for MIMO Transmissions, 3rd Generation Partnership Project (3GPP), Mobile Competence Centre ; 650, Route Des Lucioles ; F-06921 Sophia-Antipolis Cedex ; France, vol. RAN WG1, No. Montreal, Canada; 20100510, May 4, 2010, XP050419949, [retrieved on May 4, 2010].

Fujitsu: "Aperiodic CQI reporting for multiple DL component carriers", 3GPP TSG-RAN WG1 Meeting #62b, R1-105742, <URL: http://www.3gpp.org/ftp/tsg_ran/WG1_RL1/TSGR1_62b/Docs/R1-105742.zip>, Oct. 15, 2010, 3 Pages.

* cited by examiner

CQI-ONLY TRANSMISSION ON THE PUSCH

RELATED APPLICATIONS

This application is related to and claims priority from U.S. Provisional Patent Application Ser. No. 61/411,345, filed Nov. 8, 2010, for "CQI ONLY TRANSMISSION ON PUSCH," which is incorporated herein by reference.

TECHNICAL FIELD

The present disclosure relates generally to wireless communication systems. More specifically, the present disclosure relates to systems and methods for CQI-only transmission on the PUSCH.

BACKGROUND

Wireless communication systems are widely deployed to provide various types of communication content such as voice, video, data and so on. These systems may be multiple-access systems capable of supporting simultaneous communication of multiple terminals with one or more base stations.

A terminal may generate data about the channel between a base station and the terminal. For example, a terminal may generate channel quality indicators (CQIs) and precoding matrix indicators (PMIs). This data may increase the downlink throughput to the terminal while reducing interference. As wireless communication systems become more complex, the amount of data generated by the terminal about the channel between the base station and the terminal continues to increase. Benefits may be realized by improvements related to the generation and transmission of channel quality indicators (CQIs).

SUMMARY

A method for transmitting a channel quality indicator-only feedback payload is described. A channel quality indicator scheduling message is received from a base station. A channel quality indicator-only feedback payload is generated. The channel quality indicator-only feedback payload is transmitted on a physical uplink shared channel.

The method may be performed by a wireless communication device. The channel quality indicator-only feedback payload may be transmitted using quadrature phase shift keying modulation when a modulation and coding scheme index in the channel quality indicator scheduling message is set to 29 and the channel quality indicator scheduling message was transmitted using downlink control information format 0. The channel quality indicator-only feedback payload may be transmitted using 16 quadrature amplitude modulation when a modulation and coding scheme index in the channel quality indicator scheduling message is set to 31 and the channel quality indicator scheduling message was transmitted using downlink control information format 0.

The channel quality indicator-only feedback payload may be transmitted using quadrature phase shift keying modulation when a rank of uplink transmission is equal to 1, a first modulation and coding scheme index in the channel quality indicator scheduling message is set to 29 and the channel quality indicator scheduling message was transmitted using downlink control information format 4. The channel quality indicator-only feedback payload may be transmitted using 16 quadrature amplitude modulation when a rank of uplink transmission is equal to 1, a first modulation and coding scheme index in the channel quality indicator scheduling message is set to 31 and the channel quality indicator scheduling message was transmitted using downlink control information format 4.

The channel quality indicator-only feedback payload may be transmitted using quadrature phase shift keying modulation on all layers when a rank of uplink transmission is greater than 1, a first modulation and coding scheme index in the channel quality indicator scheduling message is set to 29, a second modulation and coding scheme index in the channel quality indicator scheduling message is set to 29 and the channel quality indicator scheduling message was transmitted using downlink control information format 4.

The channel quality indicator-only feedback payload may be transmitted using a requested number of physical resource blocks in the channel quality indicator scheduling message.

A method for scheduling a channel quality indicator-only feedback payload is also described. The method includes beginning to generate a channel quality indicator scheduling message. The method also includes determining whether quadrature phase shift keying modulation or 16 quadrature amplitude modulation is required for the channel quality indicator-only feedback payload. A modulation and coding scheme index is set according to whether quadrature phase shift keying modulation or 16 quadrature amplitude modulation is required for the channel quality indicator-only feedback payload. The channel quality indicator scheduling message is transmitted to a wireless communication device.

The method may be performed by a base station. The channel quality indicator scheduling message may be transmitted on the physical downlink control channel. The channel quality indicator scheduling message may be transmitted using downlink control information format 0 when quadrature phase shift keying modulation is required for the channel quality indicator-only feedback payload. The modulation and coding scheme index may be set to 29.

The channel quality indicator scheduling message may be transmitted using downlink control information format 0 when 16 quadrature amplitude modulation is required for the channel quality indicator-only feedback payload. The modulation and coding scheme index may be set to 31.

The channel quality indicator scheduling message may be transmitted using downlink control information format 4. It may be determined whether a rank of the channel quality indicator-only feedback payload is greater than one. If the rank of the channel quality indicator-only feedback payload is one and quadrature phase shift keying modulation is required for the channel quality indicator-only feedback payload, a first modulation and coding scheme index may be set to 29. If the rank of the channel quality indicator-only feedback payload is one and 16 quadrature amplitude modulation is required for the channel quality indicator-only feedback payload, a first modulation and coding scheme index may be set to 31.

A requested number of physical resource blocks of the channel quality indicator-only feedback payload may be set to a physical resource block maximum. The physical resource block maximum may be set to a value greater than four when an aperiodic channel quality indicator report mode is configured, when multi-carrier aperiodic channel quality indicator reporting is supported and/or when a system bandwidth configuration is greater than 5 megahertz. The physical resource block maximum may be set to a value less than or equal to four when an aperiodic channel quality indicator report mode is not configured, multi-carrier aperiodic channel quality indicator reporting is not supported, and a system bandwidth configuration is larger than 5 megahertz.

If the rank of the channel quality indicator-only feedback payload is greater than one, quadrature phase shift keying may be required for the channel quality indicator-only feedback payload. A first modulation and coding scheme index may be set to 29 and a second modulation and coding scheme index may be set to 29. A requested number of physical resource blocks of the channel quality indicator-only feedback payload may then be set to a value less than or equal to four.

A wireless device configured for transmitting a channel quality indicator-only feedback payload is also described. The wireless device includes a processor, memory in electronic communication with the processor and instructions stored in the memory. The instructions are executable by the processor to receive a channel quality indicator scheduling message from a base station. The instructions are also executable by the processor to generate a channel quality indicator-only feedback payload. The instructions are further executable by the processor to transmit the channel quality indicator-only feedback payload on a physical uplink shared channel.

A wireless device configured for scheduling a channel quality indicator-only feedback payload is described. The wireless device includes a processor, memory in electronic communication with the processor and instructions stored in the memory. The instructions are executable by the processor to begin generating a channel quality indicator scheduling message. The instructions are also executable by the processor to determine whether quadrature phase shift keying modulation or 16 quadrature amplitude modulation is required for the channel quality indicator-only feedback payload. The instructions are further executable by the processor to set a modulation and coding scheme index according to whether quadrature phase shift keying modulation or 16 quadrature amplitude modulation is required for the channel quality indicator-only feedback payload. The instructions are also executable by the processor to transmit the channel quality indicator scheduling message to a wireless communication device.

A wireless device configured for transmitting a channel quality indicator-only feedback payload is also described. The wireless device includes means for receiving a channel quality indicator scheduling message from a base station. The wireless device also includes means for generating a channel quality indicator-only feedback payload. The wireless device further includes means for transmitting the channel quality indicator-only feedback payload on a physical uplink shared channel.

A wireless device configured for scheduling a channel quality indicator-only feedback payload is described. The wireless device includes means for determining whether quadrature phase shift keying modulation or 16 quadrature amplitude modulation is required for the channel quality indicator-only feedback payload. The wireless device also includes means for setting a modulation and coding scheme index according to whether quadrature phase shift keying modulation or 16 quadrature amplitude modulation is required for the channel quality indicator-only feedback payload. The wireless device further includes means for transmitting the channel quality indicator scheduling message to a wireless communication device.

A computer-program product for transmitting a channel quality indicator-only feedback payload is also described. The computer-program product includes a non-transitory computer-readable medium having instructions thereon. The instructions include code for causing a wireless device to receive a channel quality indicator scheduling message from a base station. The instructions also include code for causing the wireless device to generate a channel quality indicator-only feedback payload. The instructions further include code for causing the wireless device to transmit the channel quality indicator-only feedback payload on a physical uplink shared channel.

A computer-program product for scheduling a channel quality indicator-only feedback payload is described. The computer-program product includes a non-transitory computer-readable medium having instructions thereon. The instructions include code for causing a wireless device to begin generating a channel quality indicator scheduling message. The instructions also include code for causing the wireless device to determine whether quadrature phase shift keying modulation or 16 quadrature amplitude modulation is required for the channel quality indicator-only feedback payload. The instructions further include code for causing the wireless device to set a modulation and coding scheme index according to whether quadrature phase shift keying modulation or 16 quadrature amplitude modulation is required for the channel quality indicator-only feedback payload. The instructions also include code for causing the wireless device to transmit the channel quality indicator scheduling message to a wireless communication device.

DETAILED DESCRIPTION

The 3$^{rd}$ Generation Partnership Project (3GPP) is a collaboration between groups of telecommunications associations that aims to define a globally applicable 3$^{rd}$ generation (3G) mobile phone specification. 3GPP Long Term Evolution (LTE) is a 3GPP project aimed at improving the Universal Mobile Telecommunications System (UMTS) mobile phone standard. The 3GPP may define specifications for the next generation of mobile networks, mobile systems and mobile devices. In 3GPP LTE, a mobile station or device may be referred to as a "user equipment" (UE).

The systems and methods disclosed herein may be described with reference to one or more specifications, such as 3GPP Release-8, 3GPP Release-9, 3GPP Release-10, LTE and LTE-A. However, the concepts may also be applied to other wireless communication systems.

Figure 1:
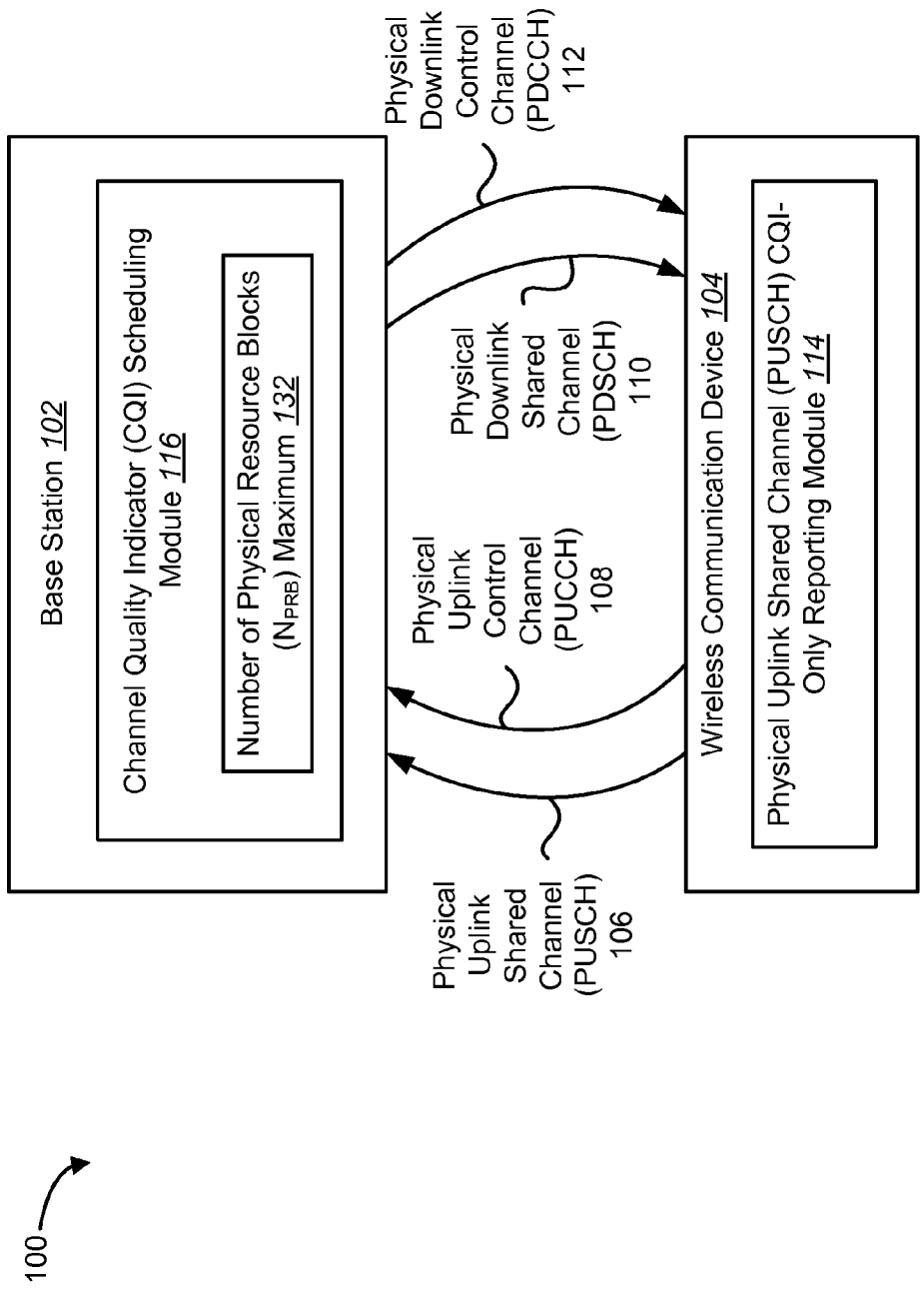
FIG. 1 shows a wireless communication system with multiple wireless devices.

FIG. 1 shows a wireless communication system 100 with multiple wireless devices. Wireless communication systems 100 are widely deployed to provide various types of communication content such as voice, data and so on. A wireless device may be a base station 102 or a wireless communication device 104.

A base station 102 is a station that communicates with one or more wireless communication devices 104. A base station 102 may also be referred to as, and may include some or all of the functionality of, an access point, a broadcast transmitter, a NodeB, an evolved NodeB, a home evolved NodeB (HeNB), etc. The term "Base Station" will be used herein. Each base station 102 provides communication coverage for a particular geographic area. A base station 102 may provide communication coverage for one or more wireless communication devices 104. The term "cell" can refer to a base station 102 and/or its coverage area depending on the context in which the term is used.

A wireless communication device 104 may also be referred to as, and may include some or all of the functionality of, a terminal, an access terminal, a user equipment (UE), a subscriber unit, a station, etc. A wireless communication device 104 may be a cellular phone, a personal digital assistant (PDA), a wireless device, a wireless modem, a handheld device, a laptop computer, etc.

A wireless communication device 104 may communicate with zero, one or multiple base stations 102 on the downlink and/or uplink at any given moment. The downlink (or forward link) refers to the communication link from a base station 102 to a wireless communication device 104, and the uplink (or reverse link) refers to the communication link from a wireless communication device 104 to a base station 102.

Communications in a wireless communication system 100 (e.g., a multiple-access system) may be achieved through transmissions over a wireless link. Such a communication link may be established via a single-input and single-output (SISO), multiple-input and single-output (MISO) or a multiple-input and multiple-output (MIMO) system. A MIMO system includes transmitter(s) and receiver(s) equipped, respectively, with multiple (NT) transmit antennas and multiple (NR) receive antennas for data transmission. SISO and MISO systems are particular instances of a MIMO system. The MIMO system can provide improved performance (e.g., higher throughput, greater capacity or improved reliability) if the additional dimensionalities created by the multiple transmit and receive antennas are utilized.

The wireless communication system 100 may utilize MIMO. A MIMO system may support both time division duplex (TDD) and frequency division duplex (FDD) systems. In a TDD system, uplink and downlink transmissions are on the same frequency region so that the reciprocity principle allows the estimation of the downlink channel from the uplink channel. This enables a transmitting wireless device to extract transmit beamforming gain from communications received by the transmitting wireless device.

The wireless communication system 100 may be a multiple-access system capable of supporting communication with multiple wireless communication devices 104 by sharing the available system resources (e.g., bandwidth and transmit power). Examples of such multiple-access systems include code division multiple access (CDMA) systems, wideband code division multiple access (W-CDMA) systems, time division multiple access (TDMA) systems, frequency division multiple access (FDMA) systems, orthogonal frequency division multiple access (OFDMA) systems, single-carrier frequency division multiple access (SC-FDMA) systems, 3$^{rd}$ Generation Partnership Project (3GPP) Long Term Evolution (LTE) systems and spatial division multiple access (SDMA) systems.

The terms "networks" and "systems" are often used interchangeably. A CDMA network may implement a radio technology such as Universal Terrestrial Radio Access (UTRA), cdma2000, etc. UTRA includes W-CDMA and Low Chip Rate (LCR) while cdma2000 covers IS-2000, IS-95 and IS-856 standards. A TDMA network may implement a radio technology such as Global System for Mobile Communications (GSM). An OFDMA network may implement a radio technology such as Evolved UTRA (E-UTRA), IEEE 802.11, IEEE 802.16, IEEE 802.20, Flash-OFDMA, etc. UTRA, E-UTRA and GSM are part of Universal Mobile Telecommunication System (UMTS). Long Term Evolution (LTE) is a release of UMTS that uses E-UTRA. UTRA, E-UTRA, GSM, UMTS and LTE are described in documents from an organization named "3rd Generation Partnership Project" (3GPP). cdma2000 is described in documents from an organization named "3rd Generation Partnership Project 2" (3GPP2). For clarity, certain aspects of the techniques are described below for LTE, and LTE terminology is used in much of the description below.

Multiple channels may be used between the base station 102 and the wireless communication device 104 on both the downlink and the uplink. A physical uplink shared channel (PUSCH) 106 may be used to transmit user data from the wireless communication device 104 to the base station 102. A physical uplink control channel (PUCCH) 108 may be used to transport user signaling data from the wireless communication device 104 to the base station 102. A physical downlink shared channel (PDSCH) 110 may be used to transmit common user data and control information from a base station 102 to a wireless communication device 104. A physical downlink control channel (PDCCH) 112 may be used to transmit control information from a base station 102 to a wireless communication device 104.

In LTE Rel-8, only downlink control information (DCI) format 0 is supported for an aperiodic channel quality indicator (CQI) request that does not include scheduling data on the uplink shared channel (UL-SCH). When the modulation and coding scheme index $I_{MCS}$ is set to 29, the channel quality indicator (CQI) request bit in downlink control information (DCI) format 0 is set to 1 and the number of physical resource blocks $N_{PRB}$ is less than or equal to 4, the wireless communication device 104 knows that there is no transport block for the uplink shared channel (UL-SCH) and only the channel quality indicator (CQI)/precoding matrix indicator (PMI) feedback for the current physical uplink shared channel (PUSCH) reporting mode is to be transmitted on the physical uplink shared channel (PUSCH) 106 using quadrature phase shift keying (QPSK) modulation (Qm=2) and $N_{PRB}$ resource blocks.

In some scenarios for LTE Rel-10, larger than normal aperiodic channel quality indicator (CQI)/precoding matrix indicator (PMI) feedback payloads on the physical uplink shared channel (PUSCH) 106 may be beneficial. Larger aperiodic channel quality indicator (CQI)/precoding matrix indicator (PMI) feedback payloads may be used to facilitate advanced downlink multiple-input and multiple-output (DL-MIMO) operation and carrier aggregation.

To support larger payloads when reporting CQI-only on the physical uplink shared channel (PUSCH) 106, it is necessary to allow one of a higher modulation order, a larger transmission bandwidth or spatial multiplexing. The wireless communication device 104 may include a physical uplink shared channel (PUSCH) CQI-only reporting module 114. The physical uplink shared channel (PUSCH) CQI-only reporting module 114 may be used by the wireless communication device 104 to generate and transmit CQI-only feedback payloads as instructed by the base station 102. The channel quality indicator (CQI) may be placed on all layers of both codewords (i.e., the channel quality indicator (CQI) is treated the same as data on the uplink shared channel (UL-SCH)).

With the assumption that support of Rel-10 physical uplink shared channel (PUSCH) feedback mode 3-1 or 3-2 requires up to twice the number of bits compared to the Rel-8 equivalent, the proposed number of physical resource blocks $N_{PRB}$ range increase should be sufficient. The proposed modulation order increase allows for more efficient bandwidth utilization in high uplink signal-to-noise ratio (SNR) cases. Support for the simultaneous reporting for the primary component carrier (PCC) and one or more secondary component carriers (SCCs) is also needed and can be supported with the present systems and methods, although simultaneous CQI-only reporting of more than two component carriers (CCs) may not be effectively supported in very low uplink signal-to-noise ratio (SNR) conditions.

The base station 102 may include a channel quality indicator (CQI) scheduling module 116. The channel quality indicator (CQI) scheduling module 116 may be used by the base station 102 to schedule CQI-only feedback payloads on the physical uplink shared channel (PUSCH) 106. The number of physical resource blocks $N_{PRB}$ used for CQI-only reporting may be specified by the base station 102. In one configuration, the number of physical resource blocks $N_{PRB}$ used for CQI-only reporting may be less than a $N_{PRB}$ maximum 132 defined in the channel quality indicator (CQI) scheduling module 116. Determining the $N_{PRB}$ maximum 132 is discussed below in relation to FIG. 5.

Downlink control information (DCI) format 0 may be used for the transmission of resource grants for the physical uplink shared channel (PUSCH) 106. Downlink control information (DCI) format 4 is a new format introduced in Release-10. Downlink control information (DCI) format 4 may be used for the transmission of resource grants for the physical uplink shared channel (PUSCH) 106 to support uplink MIMO operation. The systems and methods may thus provide support for both 16 quadrature amplitude modulation (QAM) and quadrature phase shift keying (QPSK) modulation for CQI-only physical uplink shared channel (PUSCH) 106 transmissions of rank-1 (non-MIMO). The systems and methods may also allow larger bandwidth allocation for CQI-only transmissions in those scenarios where a larger feedback payload is needed. The systems and methods may further support rank-1 beamforming and rank>1 (MIMO) spatial multiplexing for CQI-only physical uplink shared channel (PUSCH) 106 transmissions. The systems and methods may also allow both downlink control information (DCI) format 0 and downlink control information (DCI) format 4 to trigger CQI-only physical uplink shared channel (PUSCH) 106 transmissions.

The regular $rv_{idx}$ sequence is {0, 2, 3, 1}. Since $rv_{idx}$={1, 3} are expected to be used the least often, it is proposed to use modulation and coding scheme index $I_{MCS}$ 222 values of 29 and 31 for CQI-only indication.

Figure 2:
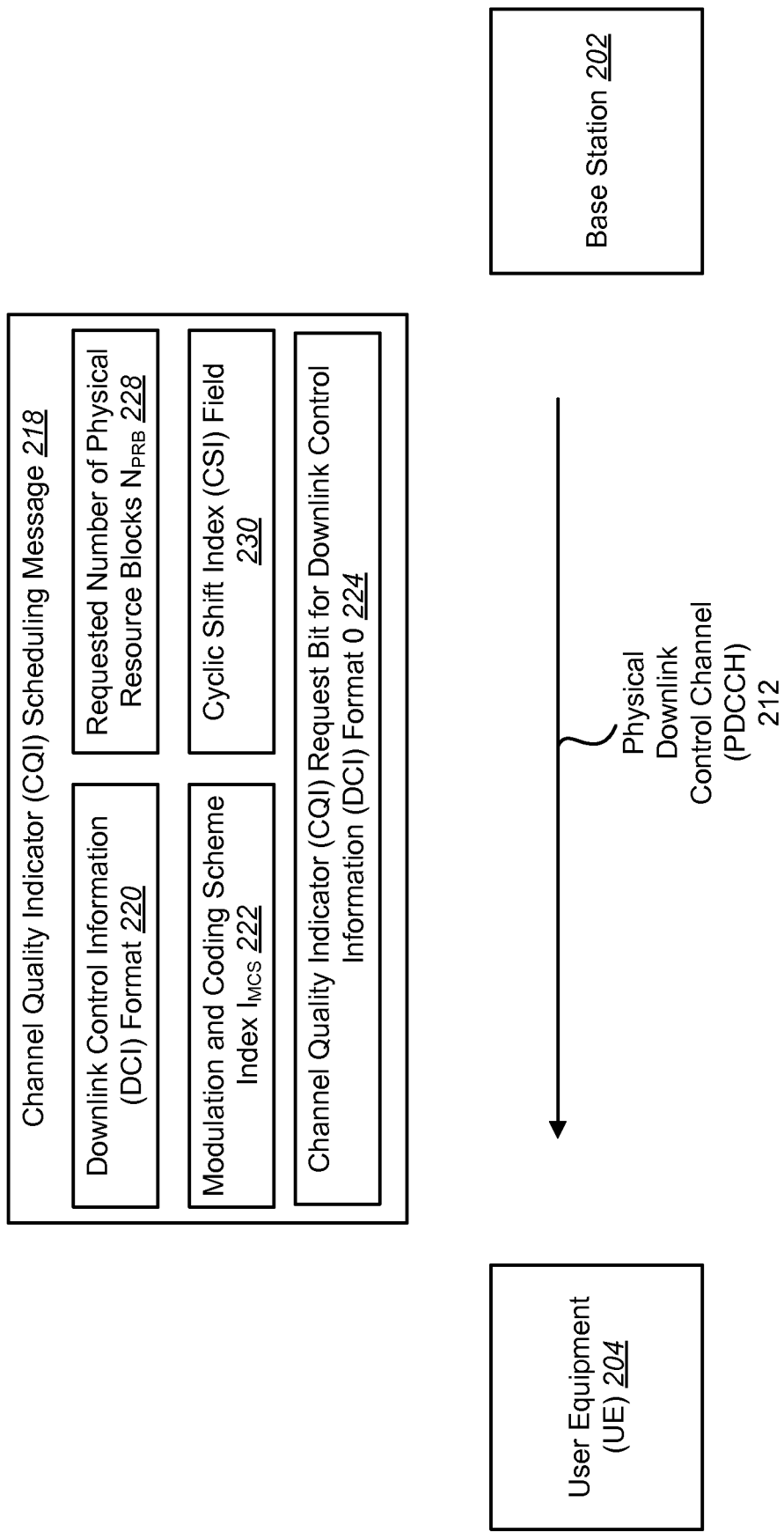
FIG. 2 illustrates a channel quality indicator (CQI) scheduling message transmitted from a base station to a user equipment (UE) on the physical downlink control channel (PDCCH)

FIG. 2 illustrates a channel quality indicator (CQI) scheduling message 218 transmitted from a base station 202 to a user equipment (UE) 204 on the physical downlink control channel (PDCCH) 212. The user equipment (UE) 204 of FIG. 2 may be one configuration of the wireless communication device 104 of FIG. 1. The base station 202 of FIG. 2 may be one configuration of the base station 102 of FIG. 1. The base station 202 may generate a channel quality indicator (CQI) scheduling message 218 that instructs the user equipment (UE) 204 to generate and transmit a CQI-only feedback payload. The CQI-only feedback payload may include only channel quality indicator (CQI) data (and no user data). The base station 202 may transmit the channel quality indicator (CQI) scheduling message 218 to the user equipment (UE) 204 on the physical downlink control channel (PDCCH) 212.

The CQI-only feedback payload may be based on the downlink control information (DCI) format 220 of the channel quality indicator (CQI) scheduling message 218 received from the base station 202. The downlink control information (DCI) format 220 may be either downlink control information (DCI) format 0 or downlink control information (DCI) format 4. The channel quality indicator (CQI) scheduling message 218 may also include a modulation and coding scheme index $I_{MCS}$ 222. Various modulation schemes and coding rates are defined by the standard and are represented by the $I_{MCS}$ value 222. By specifying an $I_{MCS}$ value 222 of 29 in the channel quality indicator (CQI) scheduling message 218, the base station 202 may instruct the user equipment (UE) 204 to generate a CQI-only feedback payload that uses quadrature phase shift keying (QPSK) modulation (Qm=2). By specifying an $I_{MCS}$ value 222 of 31 in the channel quality indicator (CQI) scheduling message 218, the base station 202 may instruct the user equipment (UE) 204 to generate a CQI-only feedback payload that uses 16 quadrature amplitude modulation (QAM) (Qm=4).

The channel quality indicator (CQI) scheduling message 218 may include a channel quality indicator (CQI) request bit 224 for downlink control information (DCI) format 0. The channel quality indicator (CQI) request bit 224 for format 0 may be set to 1, thus indicating to the user equipment (UE) 204 to feedback a channel quality indicator (CQI).

The channel quality indicator (CQI) scheduling message 218 may include a requested number of physical resource blocks $N_{PRB}$ 228. The requested number of physical resource blocks $N_{PRB}$ 228 may instruct the user equipment (UE) 204 on the number of physical resource blocks $N_{PRB}$ that may be used for the CQI-only feedback payload. The channel quality indicator (CQI) scheduling message 218 may further include a cyclic shift index (CSI) field 230. In both downlink control information (DCI) format 0 and downlink control information (DCI) format 4, there is a 3-bit field used for cyclic shift index (CSI) signaling for the demodulation reference signal (DM-RS). Quadrature phase shift keying (QPSK) modulation may be implicitly linked to a subset of the eight possible cyclic shift values and 16 quadrature amplitude modulation (QAM) may be linked to the remaining subset of cyclic shift values. Thus, in one configuration the 3-bit cyclic shift index (CSI) field 230 for the demodulation reference signal (DM-RS) may be used to signal quadrature phase shift keying (QPSK) modulation versus 16 quadrature amplitude modulation (QAM) to the user equipment (UE) 204, instead of relying on the modulation and coding scheme index $I_{MCS}$ 222 to signal that 16 quadrature amplitude modulation (QAM) or quadrature phase shift keying (QPSK) modulation should be used for the CQI-only feedback payload.

Figure 3:
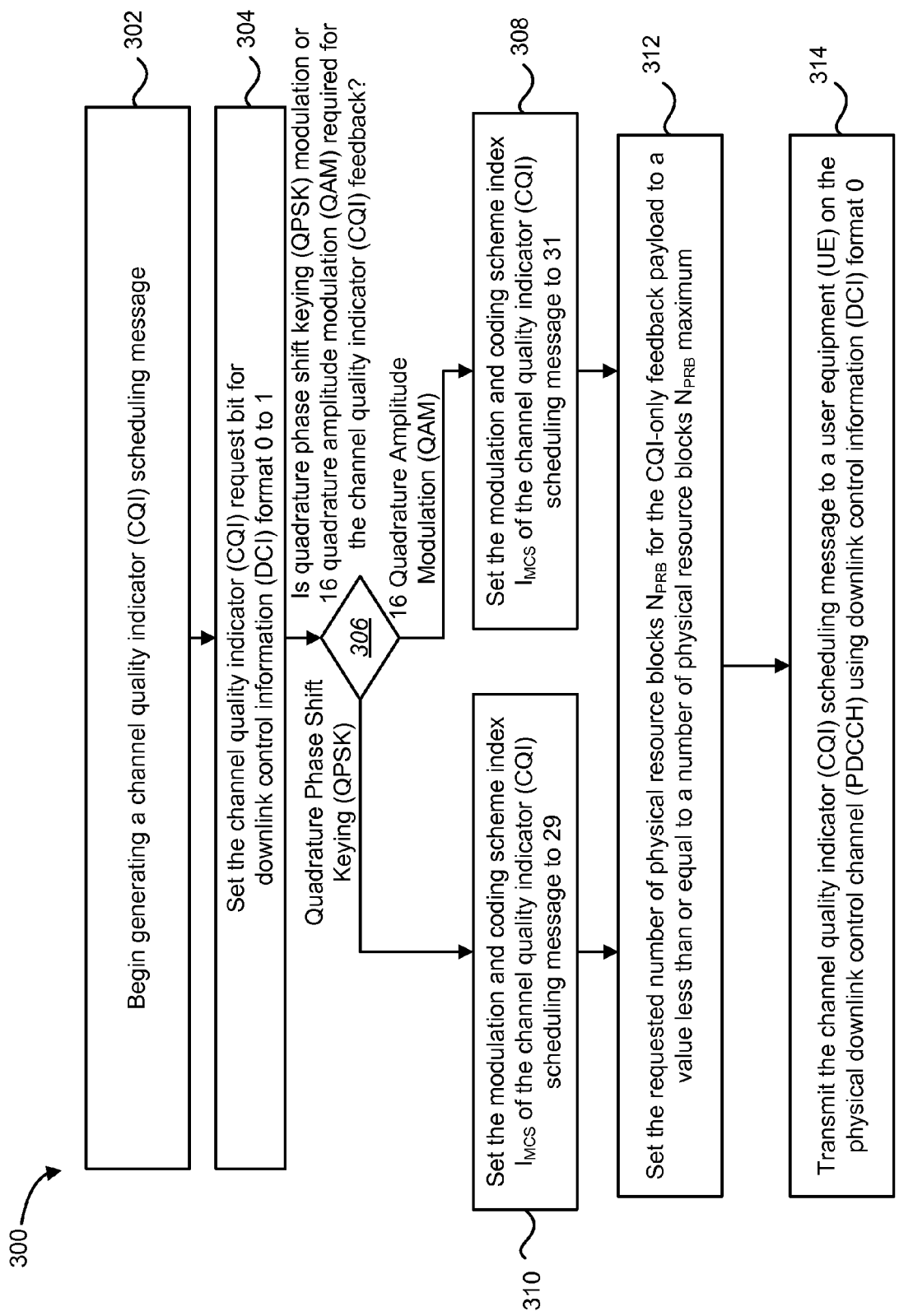
FIG. 3 is a flow diagram of a method for scheduling a CQI-only feedback payload using downlink control information (DCI) format 0.

FIG. 3 is a flow diagram of a method 300 for scheduling a CQI-only feedback payload using downlink control information (DCI) format 0. The method 300 may be performed by a base station 102 for rank-1 transmissions. The base station 102 may begin 302 generating a channel quality indicator (CQI) scheduling message 218. The base station 102 may set 304 the channel quality indicator (CQI) request bit 224 for downlink control information (DCI) format 0 to 1.

The base station 102 may determine 306 whether quadrature phase shift keying (QPSK) modulation or 16 quadrature amplitude modulation (QAM) is required for the channel quality indicator (CQI) feedback. The use of 16 quadrature amplitude modulation (QAM) may allow a larger payload than quadrature phase shift keying (QPSK) modulation. However, quadrature phase shift keying (QPSK) modulation may be decoded at a lower signal-to-noise ratio (SNR) than 16 quadrature amplitude modulation (QAM). If quadrature phase shift keying (QPSK) modulation is required for the channel quality indicator (CQI) feedback, the base station 102 may set 310 the modulation and coding scheme index $I_{MCS}$ 222 of the channel quality indicator (CQI) scheduling message 218 to 29. If 16 quadrature amplitude modulation (QAM) modulation is required for the channel quality indicator (CQI) feedback, the base station 102 may set 308 the modulation and coding scheme index $I_{MCS}$ 222 of the channel quality indicator (CQI) scheduling message 218 to 31.

The base station 102 may also set 312 the requested number of physical resource blocks $N_{PRB}$ 228 of the channel quality indicator (CQI) scheduling message 218 to a value less than or equal to an $N_{PRB}$ maximum 132. The $N_{PRB}$ maximum 132 is discussed in additional detail below in relation to FIG. 5. The base station 102 may then transmit 314 the channel quality indicator (CQI) scheduling message 218 to a user equipment (UE) 204 on the physical downlink control channel (PDCCH) 212 using downlink control information (DCI) format 0.

Figure 4:
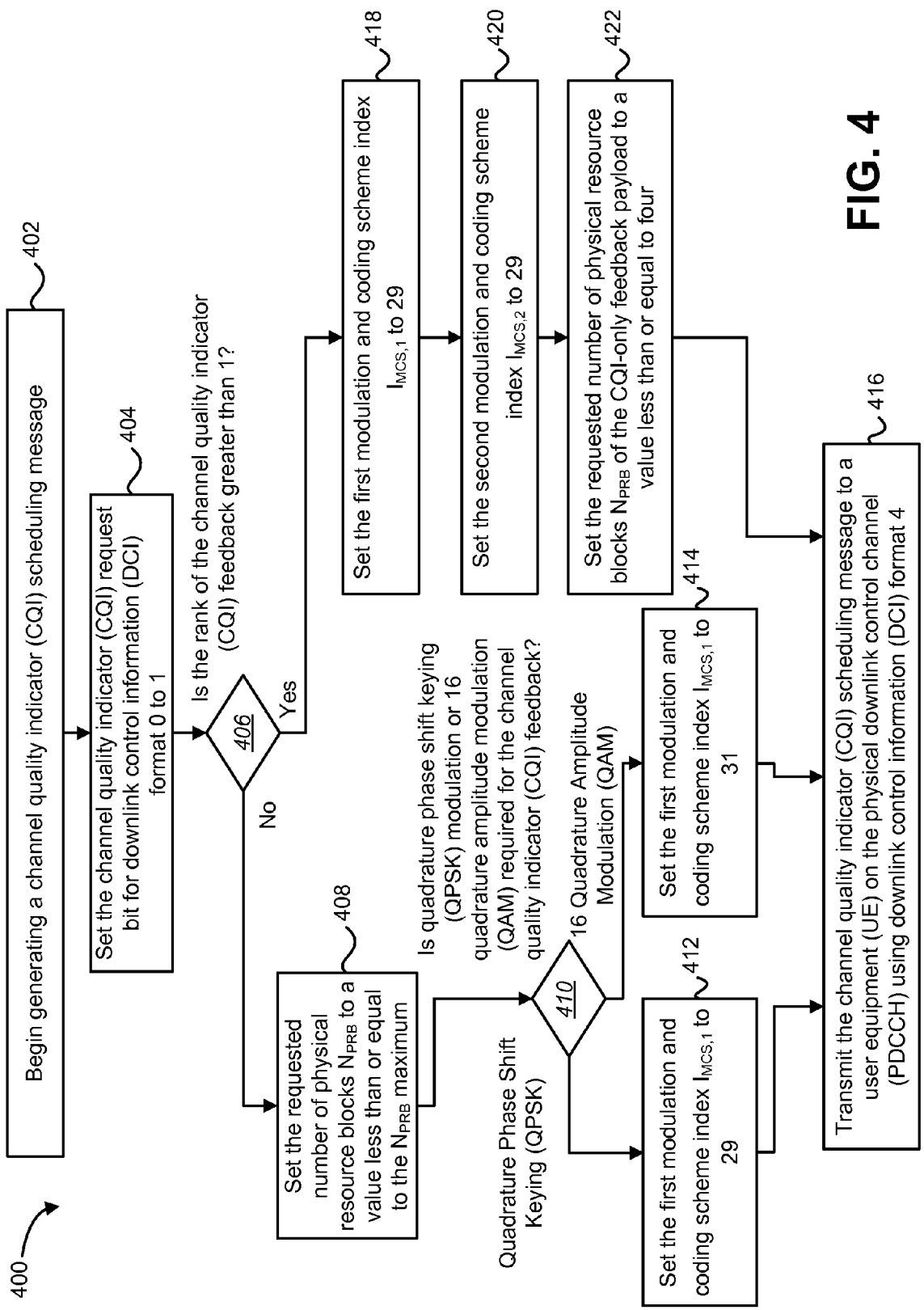
FIG. 4 is a flow diagram of a method for scheduling a CQI-only feedback payload for a user equipment (UE) using downlink control information (DCI) format 4.

FIG. 4 is a flow diagram of a method 400 for scheduling a CQI-only feedback payload for a user equipment (UE) 204 using downlink control information (DCI) format 4. The method 400 may be performed by a base station 102. Uplink multiple-input and multiple-output (UL MIMO) may be enabled on the user equipment (UE) 204. The base station 102 may begin 402 generating a channel quality indicator (CQI) scheduling message 218. The base station 102 may set 404 the channel quality indicator (CQI) request bit 224 for downlink control information (DCI) format 0 to 1. In downlink control information (DCI) format 4, there may be two bits for the channel quality indicator (CQI) request, which serve the same function as the channel quality indicator (CQI) request bit 224 for downlink control information (DCI) format 0. For the two bit channel quality indicator (CQI) request bits 224, the bits 01, 10 and 11 indicate that aperiodic channel quality indicator (CQI) is requested according to a particular configuration. The bits 00 indicate that an aperiodic channel quality indicator (CQI) is not requested. The base station 102 may determine 406 whether the rank of the channel quality indicator (CQI) feedback is greater than 1. A rank of 1 indicates a single-input and single-output (SISO) transmission while a rank greater than 1 indicates a multiple-input and multiple-output (MIMO) transmission.

If the rank of the channel quality indicator (CQI) feedback is not greater than 1, the base station 102 may set 408 the requested number of physical resource blocks $N_{PRB}$ 228 of the CQI-only feedback payload to a value less than or equal to the $N_{PRB}$ maximum 132. The $N_{PRB}$ maximum 132 is discussed below in relation to FIG. 5. The base station 102 may determine 410 whether quadrature phase shift keying (QPSK) modulation or 16 quadrature amplitude modulation (QAM) is required for the channel quality indicator (CQI) feedback. If quadrature phase shift keying (QPSK) modulation is required for the channel quality indicator (CQI) feedback, the base station 102 may set 412 the first modulation and coding scheme index $I_{MCS,1}$ 222 to 29. The base station 102 may then transmit 416 the channel quality indicator (CQI) scheduling message 218 to the user equipment (UE) 204 on the physical downlink control channel (PDCCH) 212 using downlink control information (DCI) format 4. If 16 quadrature amplitude modulation (QAM) is required for the channel quality indicator (CQI) feedback, the base station 102 may set 414 the first modulation and coding scheme index $I_{MCS,1}$ 222 to 31. The base station 102 may then transmit 416 the channel quality indicator (CQI) scheduling message 218 to the user equipment (UE) 204 on the physical downlink control channel (PDCCH) 212 using downlink control information (DCI) format 4.

If the rank of the channel quality indicator (CQI) feedback is greater than 1 (indicating a multiple-input and multiple-output (MIMO) transmission), the base station 102 may set 418 the first modulation and coding scheme index $I_{MCS,1}$ 222 to 29. The base station 102 may set 420 the second modulation and coding scheme index $I_{MCS,2}$ 222 to 29. The base station 102 may also set 422 the requested number of physical resource blocks $N_{PRB}$ 228 of the CQI-only feedback payload to a value less than or equal to four. The base station 102 may transmit 416 the channel quality indicator (CQI) scheduling message 218 to the user equipment (UE) 204 on the physical downlink control channel (PDCCH) 212 using downlink control information (DCI) format 4.

Figure 5:
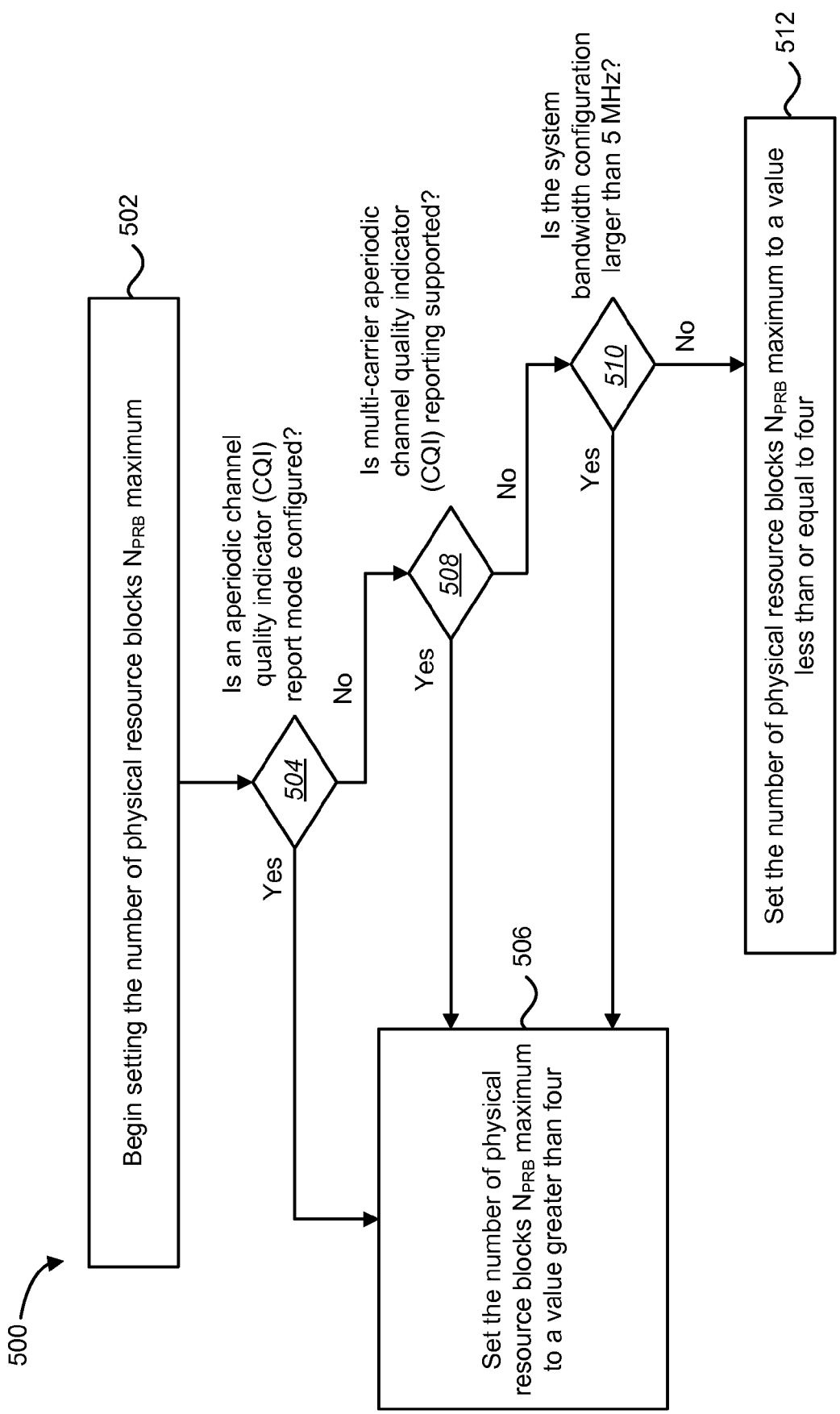
FIG. 5 is a flow diagram of a method for setting the $N_{PRB}$ maximum.

FIG. 5 is a flow diagram of a method 500 for setting the $N_{PRB}$ maximum 132. The method 500 may be performed by a base station 102 and/or by a user equipment (UE) 204. For simplicity, the method 500 is discussed below in relation to a base station 102. The method 500 may be performed when the configuration of the downlink component carriers change (semi-statically). The exact value of the $N_{PRB}$ maximum 132 may be dependent on whether there is an aperiodic channel quality indicator (CQI) report mode configuration, whether or not the wireless communication device 104 supports multi-carrier aperiodic channel quality indicator (CQI) reports and the system bandwidth configuration.

The base station 102 may begin 502 setting the $N_{PRB}$ maximum 132. The base station 102 may determine 504 whether an aperiodic channel quality indicator (CQI) report mode is configured. For example, the base station 102 may determine whether physical uplink shared channel (PUSCH) feedback mode 3-2 is enabled. If an aperiodic channel quality indicator (CQI) report mode is configured, the base station 102 may set 506 the $N_{PRB}$ maximum 132 to a value greater than four. If an aperiodic channel quality indicator (CQI) reporting mode is not configured, the base station 102 may determine 508 whether multi-carrier aperiodic channel quality indicator (CQI) reporting is supported.

If multi-carrier aperiodic channel quality indicator (CQI) reporting is supported, the base station 102 may set 506 the $N_{PRB}$ maximum 132 to a value greater than four. If multi-carrier aperiodic channel quality indicator (CQI) reporting is not supported, the base station 102 may determine 510 whether the system bandwidth is larger than 5 megahertz (MHz). 5 MHz is the proposed bandwidth threshold. If another bandwidth threshold is used, the base station 102 may instead determine whether the bandwidth configuration is larger than the new bandwidth threshold. If the system bandwidth is larger than 5 MHz, the base station 102 may set 506 the $N_{PRB}$ maximum 132 to a value greater than four. If the system bandwidth is not larger than 5 MHz, the base station 102 may set 512 the $N_{PRB}$ maximum 132 to a value less than or equal to four.

Figure 6:
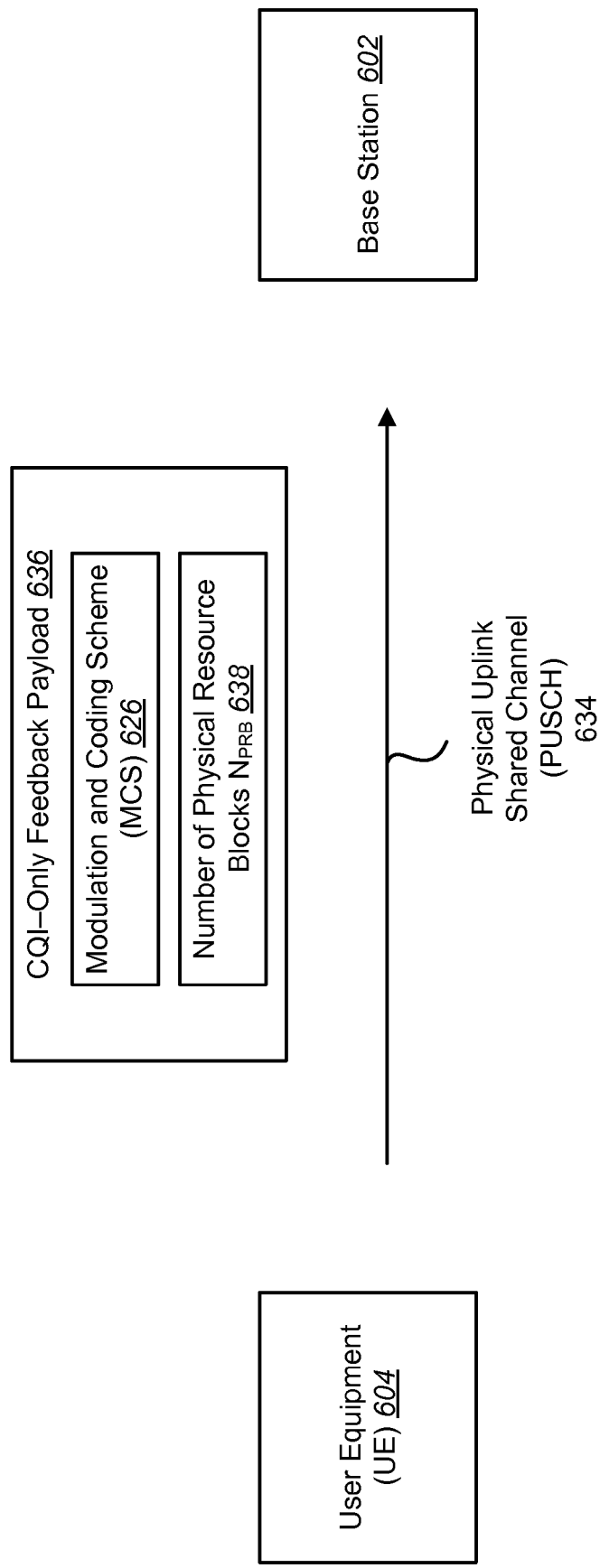
FIG. 6 illustrates a CQI-only feedback payload transmitted from a user equipment (UE) to a base station on the physical uplink shared channel (PUSCH)

FIG. 6 illustrates a CQI-only feedback payload 636 transmitted from a user equipment (UE) 604 to a base station 602 on the physical uplink shared channel (PUSCH) 634. The user equipment (UE) 604 of FIG. 6 may be one configuration of the wireless communication device 604 of FIG. 1. The base station 602 of FIG. 6 may be one configuration of the base station 102 of FIG. 1. The user equipment (UE) 604 may generate a CQI-only feedback payload 636 in response to receiving a channel quality indicator (CQI) scheduling message 218 from the base station 602.

The CQI-only feedback payload 636 may use a modulation and coding scheme (MCS) 626. The user equipment (UE) 604 may be instructed by the base station 602 in the channel quality indicator (CQI) scheduling message 218 on what modulation and coding scheme (MCS) 626 to use for the CQI-only feedback payload 636. In one configuration, when the modulation and coding scheme index $I_{MCS}$ 222 is set to 29 in the channel quality indicator (CQI) scheduling message 218, the modulation and coding scheme (MCS) 626 may be quadrature phase shift keying (QPSK). In another configuration, when the modulation and coding scheme index $I_{MCS}$ 222 is set to 31 in the channel quality indicator (CQI) scheduling message 218, the modulation and coding scheme (MCS) 626 may be 16 quadrature amplitude modulation (QAM). The CQI-only feedback payload 636 may include a number of physical resource blocks $N_{PRB}$ 638. The number of physical resource blocks $N_{PRB}$ 638 in the CQI-only feedback payload 636 may be dependent on the requested number of physical resource blocks $N_{PRB}$ 228 in the channel quality indicator (CQI) scheduling message 218.

Figure 7:
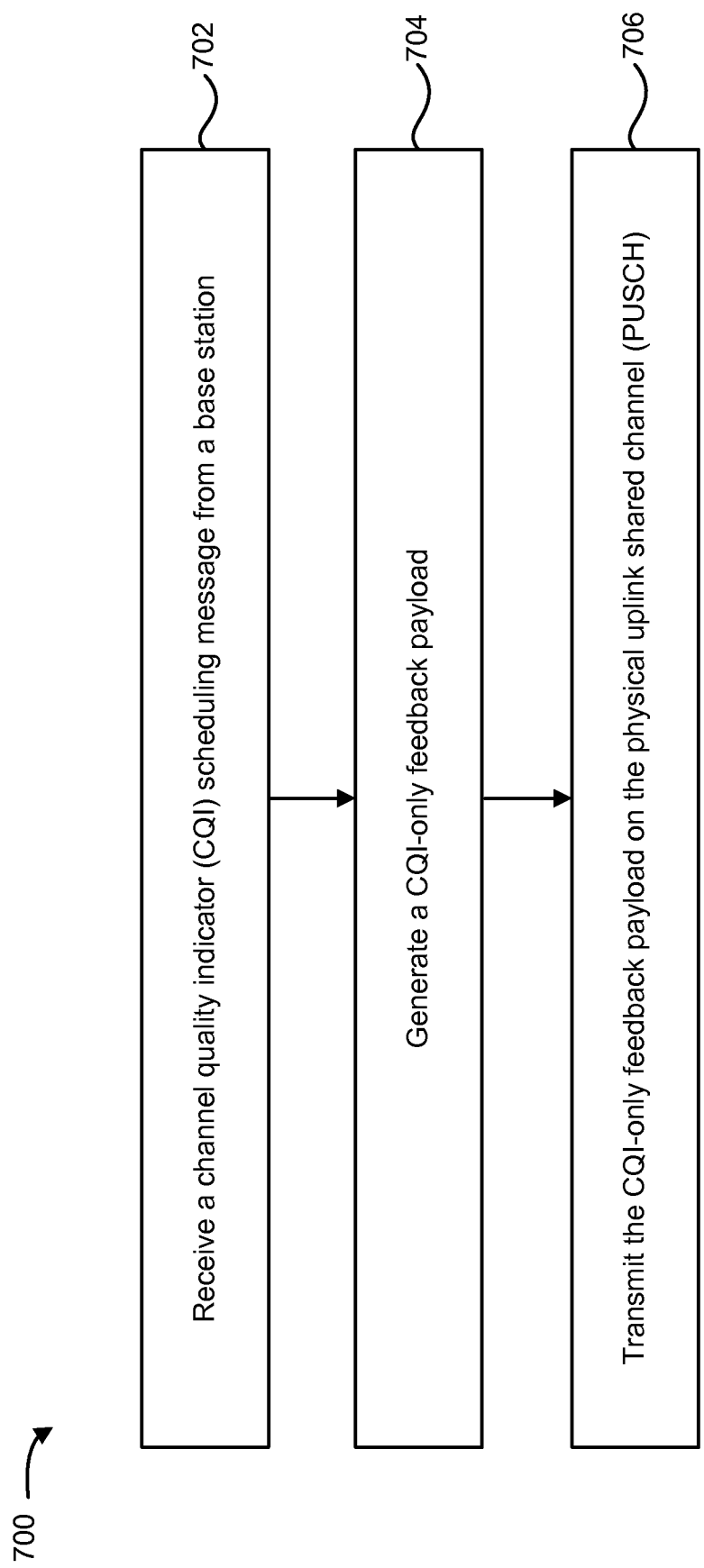
FIG. 7 is a flow diagram of a method for transmitting a CQI-only feedback payload on the physical uplink shared channel (PUSCH)

FIG. 7 is a flow diagram of a method 700 for transmitting a CQI-only feedback payload 636 on the physical uplink shared channel (PUSCH) 634. The method 700 may be performed by a wireless communication device 104. The wireless communication device 104 may receive 702 a channel quality indicator (CQI) scheduling message 218 from a base station 102. The wireless communication device 104 may generate 704 a CQI-only feedback payload 636. The wireless communication device 104 may then transmit 706 the CQI-only feedback payload 636 on the physical uplink shared channel (PUSCH) 634.

Figure 8:
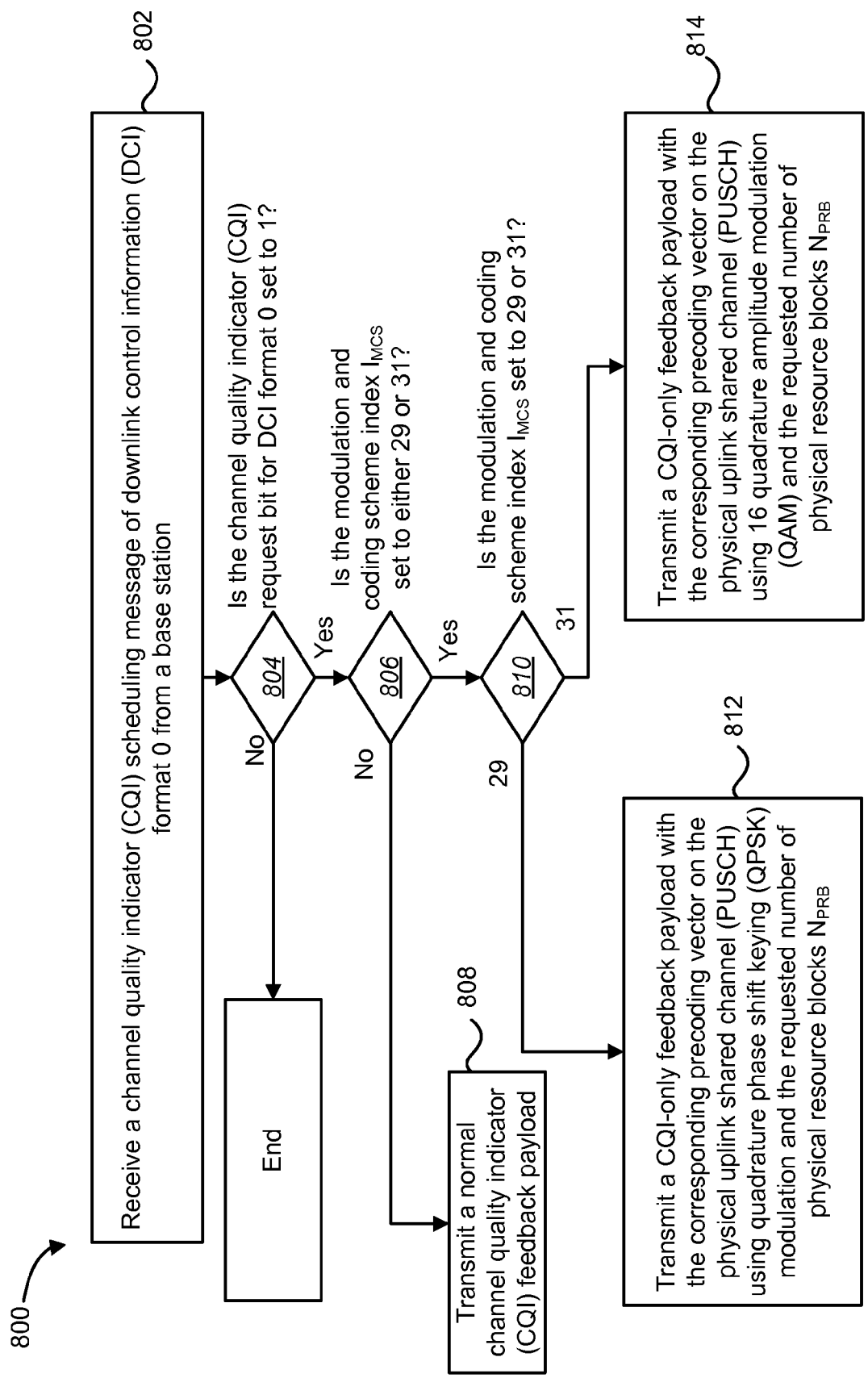
FIG. 8 is a flow diagram of another method for transmitting a CQI-only feedback payload on the physical uplink shared channel (PUSCH)

FIG. 8 is a flow diagram of another method 800 for transmitting a CQI-only feedback payload 636 on the physical uplink shared channel (PUSCH) 634. The method 800 may be performed by a wireless communication device 104. The wireless communication device 104 may receive 802 a channel quality indicator (CQI) scheduling message 218 from a base station 102. The channel quality indicator (CQI) scheduling message 218 may have been transmitted using downlink control information (DCI) format 0. The wireless communication device 104 may determine 804 whether a channel quality indicator (CQI) request bit 224 for downlink control information (DCI) format 0 is set to 1. If the channel quality indicator (CQI) request bit 224 for downlink control information (DCI) format 0 of the channel quality indicator (CQI) scheduling message 218 is not set to 1, the method 800 may end (as channel quality indicator (CQI) feedback is not requested).

If the channel quality indicator (CQI) request bit 224 for downlink control information (DCI) format 0 of the channel quality indicator (CQI) scheduling message 218 is set to 1, the wireless communication device 104 may determine 806 whether the modulation and coding scheme index $I_{MCS}$ 222 of the channel quality indicator (CQI) scheduling message 218 is set to either 29 or 31. If the modulation and coding scheme index $I_{MCS}$ 222 of the channel quality indicator (CQI) scheduling message 218 is set to a number other than 29 or 31, the wireless communication device 104 may transmit 808 a normal channel quality indicator (CQI) feedback payload.

If the modulation and coding scheme index $I_{MCS}$ 222 of the channel quality indicator (CQI) scheduling message 218 is set to either 29 or 31, the wireless communication device 104 may determine 810 whether the modulation and coding scheme index $I_{MCS}$ 222 of the channel quality indicator (CQI) scheduling message 218 is set to 29 or 31. If the modulation and coding scheme index $I_{MCS}$ 222 was set to 29, the wireless communication device 104 may transmit 812 a CQI-only feedback payload 636 with the corresponding precoding vector using quadrature phase shift keying (QPSK) modulation and the requested number of physical resource blocks $N_{PRB}$ 638 on the physical uplink shared channel (PUSCH) 634. If the modulation and coding scheme index $I_{MCS}$ 222 was set to 31, the wireless communication device 104 may transmit 814 the CQI-only feedback payload 636 with the corresponding precoding vector using 16 quadrature amplitude modulation (QAM) and the requested number of physical resource blocks $N_{PRB}$ 638 on the physical uplink shared channel (PUSCH) 634.

Figure 9:
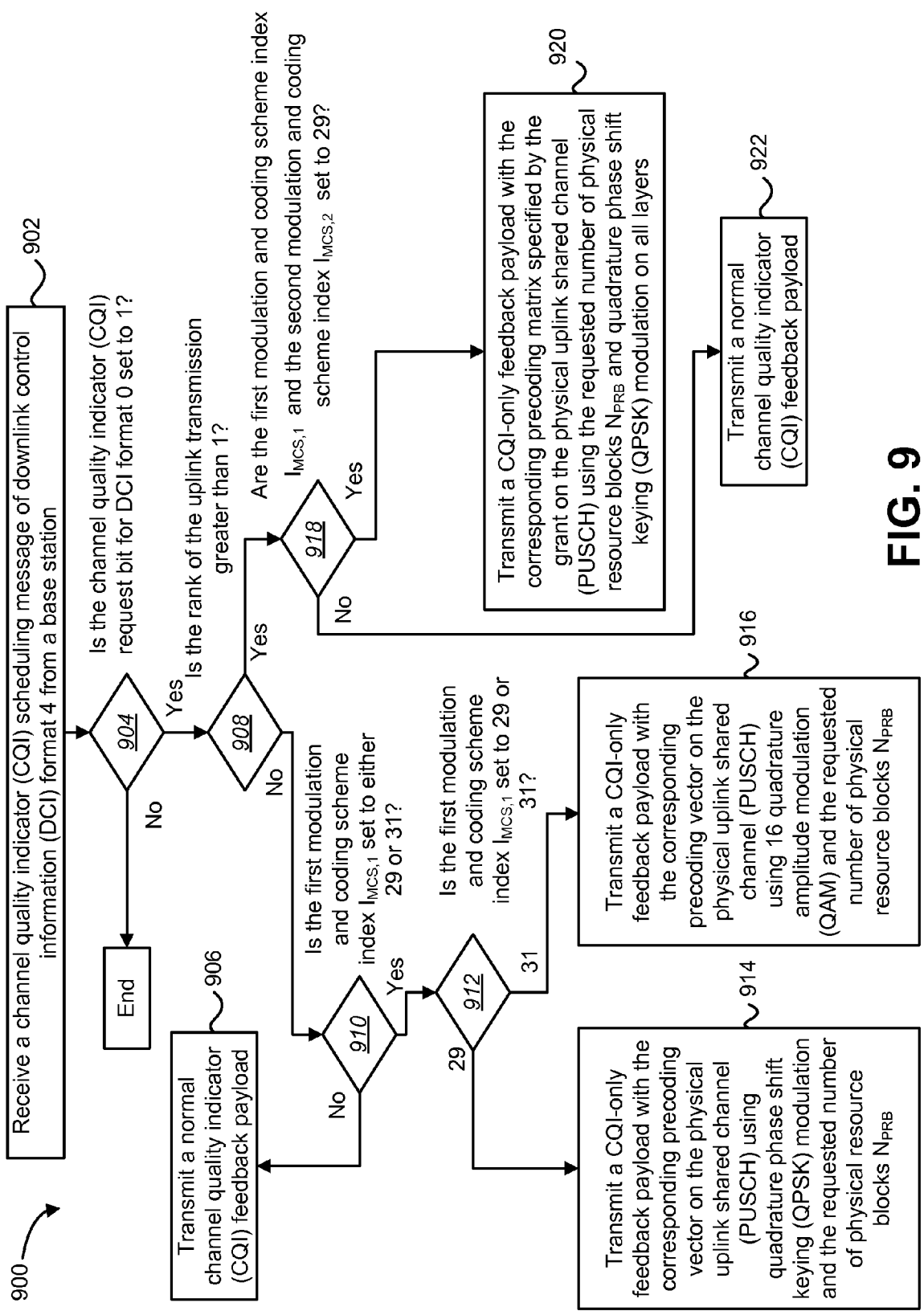
FIG. 9 is a flow diagram of yet another method for transmitting a CQI-only feedback payload on the physical uplink shared channel (PUSCH)

FIG. 9 is a flow diagram of yet another method 900 for transmitting a CQI-only feedback payload 636 on the physical uplink shared channel (PUSCH) 634. The method 900 may be performed by a wireless communication device 104. The wireless communication device 104 may receive 902 a channel quality indicator (CQI) scheduling message 218 from a base station 102. The channel quality indicator (CQI) scheduling message 218 may have been transmitted using downlink control information (DCI) format 4. The wireless communication device 104 may determine 904 whether a channel quality indicator (CQI) request bit 224 for downlink control information (DCI) format 0 is set to 1. If the channel quality indicator (CQI) request bit 224 for downlink control information (DCI) format 0 of the channel quality indicator (CQI) scheduling message 218 is not set to 1, the method 900 may end.

If the channel quality indicator (CQI) request bit 224 for downlink control information (DCI) format 0 of the channel quality indicator (CQI) scheduling message 218 is set to 1, the wireless communication device 104 may determine 908 whether the rank of the uplink transmission is greater than 1. If the rank of the uplink transmission is not greater than 1, the wireless communication device 104 may determine 910 whether the first modulation and coding scheme index $I_{MCS,1}$ 222 of the channel quality indicator (CQI) scheduling message 218 is set to either 29 or 31. If the first modulation and coding scheme index $I_{MCS,1}$ 222 of the channel quality indicator (CQI) scheduling message 218 is set to a number other than 29 or 31, the wireless communication device 104 may transmit 906 a normal channel quality indicator (CQI) feedback payload.

If the first modulation and coding scheme index $I_{MCS,1}$ 222 of the channel quality indicator (CQI) scheduling message 218 is set to either 29 or 31, the wireless communication device 104 may determine 912 whether the first modulation and coding scheme index $I_{MCS,1}$ 222 of the channel quality indicator (CQI) scheduling message 218 is set to 29 or 31. If the first modulation and coding scheme index $I_{MCS,1}$ 222 was set to 29, the wireless communication device 104 may transmit 914 a CQI-only feedback payload 636 with the corresponding precoding vector on the physical uplink shared channel (PUSCH) 634 using quadrature phase shift keying (QPSK) modulation and the requested number of physical resource blocks $N_{PRB}$ 638. If the first modulation and coding scheme index $I_{MCS,1}$ 222 was set to 31, the wireless communication device 104 may transmit 916 a CQI-only feedback payload 636 with the corresponding precoding vector on the physical uplink shared channel (PUSCH) 634 using 16 quadrature amplitude modulation (QAM) and the requested number of physical resource blocks $N_{PRB}$ 638.

If the rank of the uplink transmission is greater than 1, the wireless communication device 104 may determine 918 whether the first modulation and coding scheme index $I_{MCS,1}$ 222 and the second modulation and coding scheme index $I_{MCS,2}$ 222 are both set to 29. If either the first modulation and coding scheme index $I_{MCS,1}$ 222 or the second modulation and coding scheme index $I_{MCS,2}$ 222 is set to a value other than 29, the wireless communication device 104 may transmit 922 a normal channel quality indicator (CQI) feedback payload. If both the first modulation and coding scheme index $I_{MCS,1}$ 222 and the second modulation and coding scheme index $I_{MCS,2}$ 222 are set to 29, the wireless communication device 104 may transmit 920 a CQI-only feedback payload 636 with the corresponding precoding matrix specified by the grant on the physical uplink shared channel (PUSCH) 634 using quadrature phase shift keying (QPSK) and the requested number of physical resource blocks $N_{PRB}$ 638.

Figure 10:
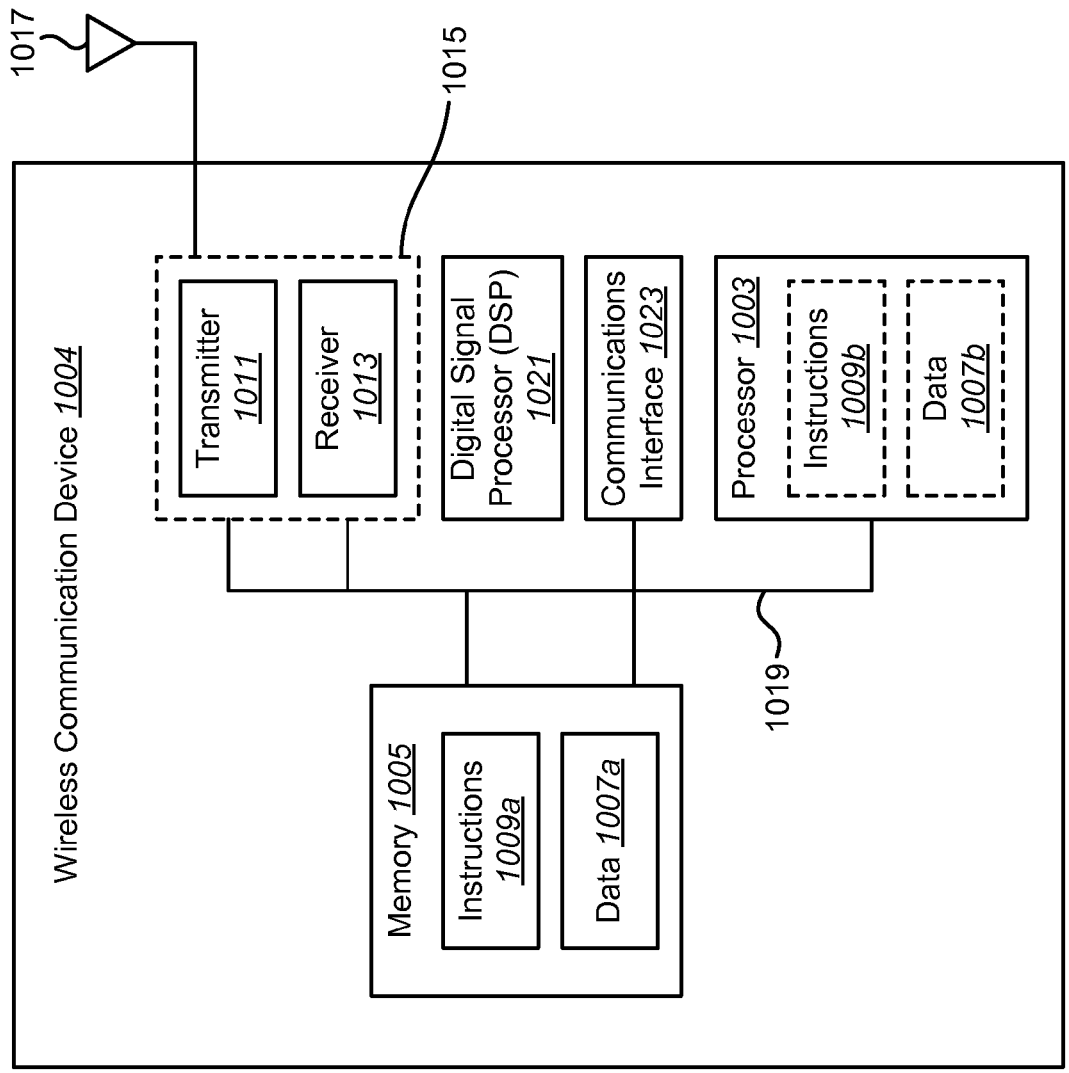
FIG. 10 illustrates certain components that may be included within a wireless communication device.

FIG. 10 illustrates certain components that may be included within a wireless communication device 1004. The wireless communication device 1004 may be an access terminal, a mobile station, a user equipment (UE), etc. The wireless communication device 1004 includes a processor 1003. The processor 1003 may be a general purpose single- or multi-chip microprocessor (e.g., an ARM), a special purpose microprocessor (e.g., a digital signal processor (DSP)), a microcontroller, a programmable gate array, etc. The processor 1003 may be referred to as a central processing unit (CPU). Although just a single processor 1003 is shown in the wireless communication device 1004 of FIG. 10, in an alternative configuration, a combination of processors (e.g., an ARM and DSP) could be used.

The wireless communication device 1004 also includes memory 1005. The memory 1005 may be any electronic component capable of storing electronic information. The memory 1005 may be embodied as random access memory (RAM), read-only memory (ROM), magnetic disk storage media, optical storage media, flash memory devices in RAM, on-board memory included with the processor, EPROM memory, EEPROM memory, registers, and so forth, including combinations thereof.

Data 1007a and instructions 1009a may be stored in the memory 1005. The instructions 1009a may be executable by the processor 1003 to implement the methods disclosed herein. Executing the instructions 1009a may involve the use of the data 1007a that is stored in the memory 1005. When the processor 1003 executes the instructions 1009a, various portions of the instructions 1009b may be loaded onto the processor 1003, and various pieces of data 1007b may be loaded onto the processor 1003.

The wireless communication device 1004 may also include a transmitter 1011 and a receiver 1013 to allow transmission and reception of signals to and from the wireless communication device 1004. The transmitter 1011 and receiver 1013 may be collectively referred to as a transceiver 1015. An antenna 1017 may be electrically coupled to the transceiver 1015. The wireless communication device 1004 may also include (not shown) multiple transmitters, multiple receivers, multiple transceivers and/or additional antennas.

The wireless communication device 1004 may include a digital signal processor (DSP) 1021. The wireless communication device 1004 may also include a communications interface 1023. The communications interface 1023 may allow a user to interact with the wireless communication device 1004.

The various components of the wireless communication device 1004 may be coupled together by one or more buses, which may include a power bus, a control signal bus, a status signal bus, a data bus, etc. For the sake of clarity, the various buses are illustrated in FIG. 10 as a bus system 1019.

Figure 11:
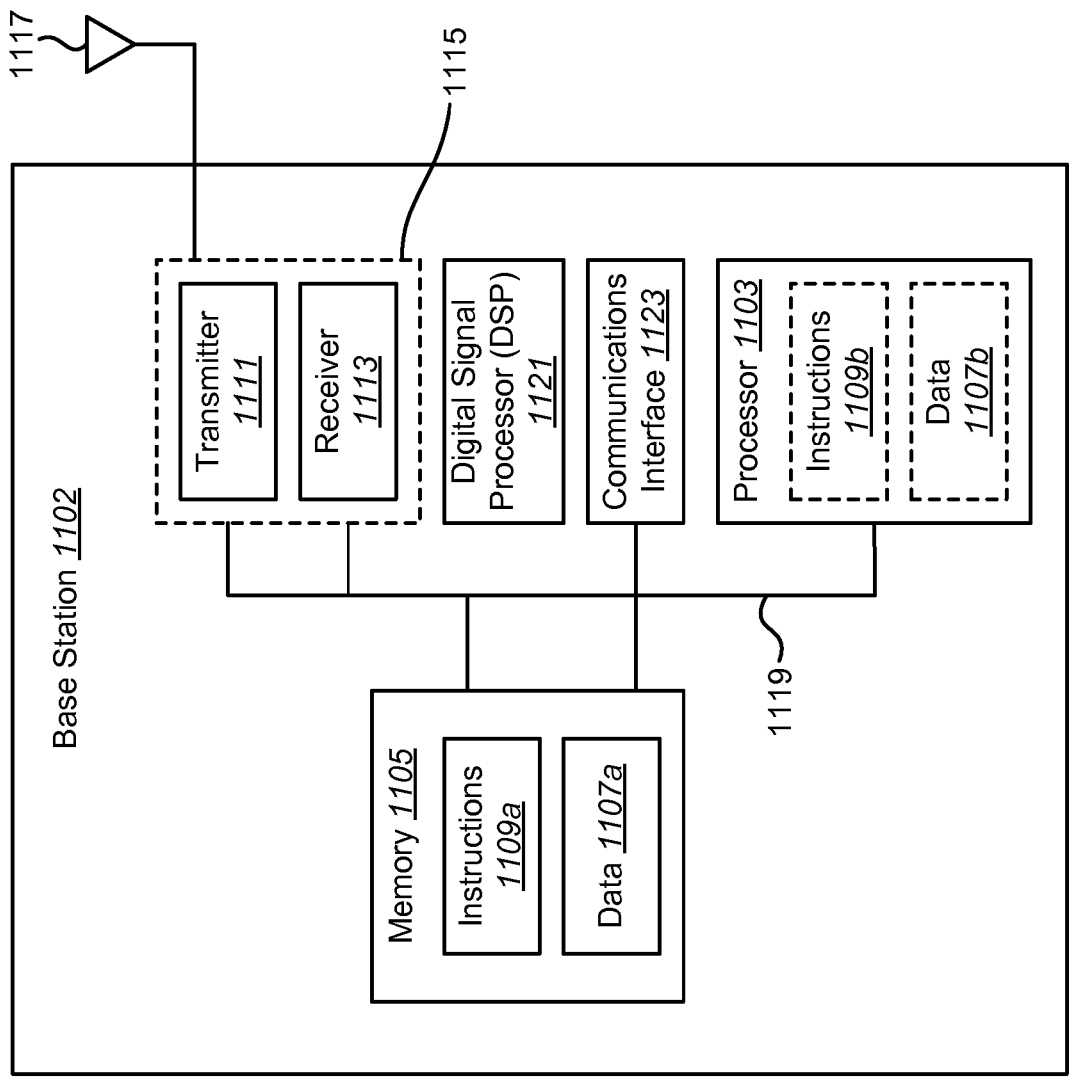
FIG. 11 illustrates certain components that may be included within a base station.

FIG. 11 illustrates certain components that may be included within a base station 1102. A base station 1102 may also be referred to as, and may include some or all of the functionality of, an access point, a broadcast transmitter, a NodeB, an evolved NodeB, etc. The base station 1102 includes a processor 1103. The processor 1103 may be a general purpose single- or multi-chip microprocessor (e.g., an ARM), a special purpose microprocessor (e.g., a digital signal processor (DSP)), a microcontroller, a programmable gate array, etc. The processor 1103 may be referred to as a central processing unit (CPU). Although just a single processor 1103 is shown in the base station 1102 of FIG. 11, in an alternative configuration, a combination of processors (e.g., an ARM and DSP) could be used.

The base station 1102 also includes memory 1105. The memory 1105 may be any electronic component capable of storing electronic information. The memory 1105 may be embodied as random access memory (RAM), read-only memory (ROM), magnetic disk storage media, optical storage media, flash memory devices in RAM, on-board memory included with the processor, EPROM memory, EEPROM memory, registers and so forth, including combinations thereof.

Data 1107a and instructions 1109a may be stored in the memory 1105. The instructions 1109a may be executable by the processor 1103 to implement the methods disclosed herein. Executing the instructions 1109a may involve the use of the data 1107a that is stored in the memory 1105. When the processor 1103 executes the instructions 1109a, various portions of the instructions 1109b may be loaded onto the processor 1103, and various pieces of data 1107b may be loaded onto the processor 1103.

The base station 1102 may also include a transmitter 1111 and a receiver 1113 to allow transmission and reception of signals to and from the base station 1102. The transmitter 1111 and receiver 1113 may be collectively referred to as a transceiver 1115. An antenna 1117 may be electrically coupled to the transceiver 1115. The base station 1102 may also include (not shown) multiple transmitters, multiple receivers, multiple transceivers and/or additional antennas.

The base station 1102 may include a digital signal processor (DSP) 1121. The base station 1102 may also include a communications interface 1123. The communications interface 1123 may allow a user to interact with the base station 1102.

The various components of the base station 1102 may be coupled together by one or more buses, which may include a power bus, a control signal bus, a status signal bus, a data bus, etc. For the sake of clarity, the various buses are illustrated in FIG. 11 as a bus system 1119.

The techniques described herein may be used for various communication systems, including communication systems that are based on an orthogonal multiplexing scheme. Examples of such communication systems include Orthogonal Frequency Division Multiple Access (OFDMA) systems, Single-Carrier Frequency Division Multiple Access (SC-FDMA) systems, and so forth. An OFDMA system utilizes orthogonal frequency division multiplexing (OFDM), which is a modulation technique that partitions the overall system bandwidth into multiple orthogonal sub-carriers. These sub-carriers may also be called tones, bins, etc. With OFDM, each sub-carrier may be independently modulated with data. An SC-FDMA system may utilize interleaved FDMA (IFDMA) to transmit on sub-carriers that are distributed across the system bandwidth, localized FDMA (LFDMA) to transmit on a block of adjacent sub-carriers, or enhanced FDMA (EFDMA) to transmit on multiple blocks of adjacent sub-carriers. In general, modulation symbols are sent in the frequency domain with OFDM and in the time domain with SC-FDMA.

The term "determining" encompasses a wide variety of actions and, therefore, "determining" can include calculating, computing, processing, deriving, investigating, looking up (e.g., looking up in a table, a database or another data structure), ascertaining and the like. Also, "determining" can include receiving (e.g., receiving information), accessing (e.g., accessing data in a memory) and the like. Also, "determining" can include resolving, selecting, choosing, establishing and the like.

The phrase "based on" does not mean "based only on," unless expressly specified otherwise. In other words, the phrase "based on" describes both "based only on" and "based at least on."

The term "processor" should be interpreted broadly to encompass a general purpose processor, a central processing unit (CPU), a microprocessor, a digital signal processor (DSP), a controller, a microcontroller, a state machine, and so forth. Under some circumstances, a "processor" may refer to an application specific integrated circuit (ASIC), a programmable logic device (PLD), a field programmable gate array (FPGA), etc. The term "processor" may refer to a combination of processing devices, e.g., a combination of a DSP and a microprocessor, a plurality of microprocessors, one or more microprocessors in conjunction with a DSP core, or any other such configuration.

The term "memory" should be interpreted broadly to encompass any electronic component capable of storing electronic information. The term memory may refer to various types of processor-readable media such as random access memory (RAM), read-only memory (ROM), non-volatile random access memory (NVRAM), programmable read-only memory (PROM), erasable programmable read-only memory (EPROM), electrically erasable PROM (EEPROM), flash memory, magnetic or optical data storage, registers, etc. Memory is said to be in electronic communication with a processor if the processor can read information from and/or write information to the memory. Memory that is integral to a processor is in electronic communication with the processor.

The terms "instructions" and "code" should be interpreted broadly to include any type of computer-readable statement(s). For example, the terms "instructions" and "code" may refer to one or more programs, routines, sub-routines, functions, procedures, etc. "Instructions" and "code" may comprise a single computer-readable statement or many computer-readable statements.

The functions described herein may be implemented in software or firmware being executed by hardware. The functions may be stored as one or more instructions on a computer-readable medium. The terms "computer-readable medium" or "computer-program product" refers to any tangible storage medium that can be accessed by a computer or a processor. By way of example, and not limitation, a computer-readable medium may comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Disk and disc, as used herein, includes compact disc (CD), laser disc, optical disc, digital versatile disc (DVD), floppy disk and Blu-ray® disc where disks usually reproduce data magnetically, while discs reproduce data optically with lasers. It should be noted that a computer-readable medium may be tangible and non-transitory. The term "computer-program product" refers to a computing device or processor in combination with code or instructions (e.g., a "program") that may be executed, processed or computed by the computing device or processor. As used herein, the term "code" may refer to software, instructions, code or data that is/are executable by a computing device or processor.

The methods disclosed herein comprise one or more steps or actions for achieving the described method. The method steps and/or actions may be interchanged with one another without departing from the scope of the claims. In other words, unless a specific order of steps or actions is required for proper operation of the method that is being described, the order and/or use of specific steps and/or actions may be modified without departing from the scope of the claims.

Further, it should be appreciated that modules and/or other appropriate means for performing the methods and techniques described herein, such as those illustrated by FIGS. 3-5 and 7-9, can be downloaded and/or otherwise obtained by a device. For example, a device may be coupled to a server to facilitate the transfer of means for performing the methods described herein. Alternatively, various methods described herein can be provided via a storage means (e.g., random access memory (RAM), read-only memory (ROM), a physical storage medium such as a compact disc (CD) or floppy disk, etc.), such that a device may obtain the various methods upon coupling or providing the storage means to the device.

It is to be understood that the claims are not limited to the precise configuration and components illustrated above. Various modifications, changes and variations may be made in the arrangement, operation and details of the systems, methods, and apparatus described herein without departing from the scope of the claims.

What is claimed is:

1. A method for transmitting a channel quality indicator-only feedback payload, comprising:
   receiving, by a wireless communication device, a channel quality indicator scheduling message from a base station;
   generating, by the wireless communication device, a channel quality indicator-only feedback payload; and
   transmitting, by the wireless communication device, the channel quality indicator-only feedback payload on a physical uplink shared channel using up to a requested number of physical resource blocks included in the channel quality indicator scheduling message, wherein the requested number of physical resource blocks is set within a physical resource block maximum, wherein the physical resource block maximum is set to a value greater than four when an aperiodic channel quality indicator report mode is configured, or when multi-carrier aperiodic channel quality indicator reporting is supported.

2. The method of claim 1, wherein the channel quality indicator-only feedback payload is transmitted using quadrature phase shift keying modulation when a modulation and coding scheme index in the channel quality indicator scheduling message is set to 29 and the channel quality indicator scheduling message was transmitted using downlink control information format 0.

3. The method of claim 1, wherein the channel quality indicator-only feedback payload is transmitted using 16 quadrature amplitude modulation when a modulation and coding scheme index in the channel quality indicator scheduling message is set to 31 and the channel quality indicator scheduling message was transmitted using downlink control information format 0.

4. The method of claim 1, wherein the channel quality indicator-only feedback payload is transmitted using quadrature phase shift keying modulation when a rank of uplink transmission is equal to 1, a first modulation and coding scheme index in the channel quality indicator scheduling message is set to 29 and the channel quality indicator scheduling message was transmitted using downlink control information format 4.

5. The method of claim 1, wherein the channel quality indicator-only feedback payload is transmitted using 16 quadrature amplitude modulation when a rank of uplink transmission is equal to 1, a first modulation and coding scheme index in the channel quality indicator scheduling message is set to 31 and the channel quality indicator scheduling message was transmitted using downlink control information format 4.

6. The method of claim 1, wherein the channel quality indicator-only feedback payload is transmitted using quadrature phase shift keying modulation on all layers when a rank of uplink transmission is greater than 1, a first modulation and coding scheme index in the channel quality indicator scheduling message is set to 29, a second modulation and coding scheme index in the channel quality indicator scheduling message is set to 29 and the channel quality indicator scheduling message was transmitted using downlink control information format 4.

7. The method of claim 1, wherein the channel quality indicator-only feedback payload is transmitted using the requested number of physical resource blocks in the channel quality indicator scheduling message.

8. A method for scheduling a channel quality indicator-only feedback payload, comprising:
beginning to generate, by a base station, a channel quality indicator scheduling message;
determining, by the base station, whether quadrature phase shift keying modulation or 16 quadrature amplitude modulation is required for the channel quality indicator-only feedback payload;
setting, by the base station, a modulation and coding scheme index according to whether the quadrature phase shift keying modulation or the 16 quadrature amplitude modulation is required for the channel quality indicator-only feedback payload;
setting, by the base station, a requested number of physical resource blocks of the channel quality indicator-only feedback payload within a physical resource block maximum, wherein the physical resource block maximum is set to a value greater than four when an aperiodic channel quality indicator report mode is configured, or when multi-carrier aperiodic channel quality indicator reporting is supported; and
transmitting, by the base station, the channel quality indicator scheduling message to a wireless communication device.

9. The method of claim 8, wherein the channel quality indicator scheduling message is transmitted on a physical downlink control channel.

10. The method of claim 8, wherein the channel quality indicator scheduling message is transmitted using downlink control information format 0, wherein the quadrature phase shift keying modulation is required for the channel quality indicator-only feedback payload, and wherein the modulation and coding scheme index is set to 29.

11. The method of claim 8, wherein the channel quality indicator scheduling message is transmitted using downlink control information format 0, wherein the 16 quadrature amplitude modulation is required for the channel quality indicator-only feedback payload, and wherein the modulation and coding scheme index is set to 31.

12. The method of claim 8, wherein the channel quality indicator scheduling message is transmitted using downlink control information format 4, and further comprising determining whether a rank of the channel quality indicator-only feedback payload is greater than one.

13. The method of claim 12, wherein the rank of the channel quality indicator-only feedback payload is one, wherein the quadrature phase shift keying modulation is required for the channel quality indicator-only feedback payload, and wherein a first modulation and coding scheme index is set to 29.

14. The method of claim 12, wherein the rank of the channel quality indicator-only feedback payload is one, wherein the 16 quadrature amplitude modulation is required for the channel quality indicator-only feedback payload, and wherein a first modulation and coding scheme index is set to 31.

15. The method of claim 12, wherein the rank of the channel quality indicator-only feedback payload is greater than one, wherein the quadrature phase shift keying is required for the channel quality indicator-only feedback payload, wherein a first modulation and coding scheme index is set to 29, and wherein a second modulation and coding scheme index is set to 29.

16. The method of claim 15, further comprising setting the requested number of physical resource blocks of the channel quality indicator-only feedback payload to a value less than or equal to four.

17. The method of claim 8, further comprising setting the physical resource block maximum to a value greater than four when a system bandwidth configuration is greater than 5 megahertz.

18. A wireless device configured for transmitting a channel quality indicator-only feedback payload, comprising:
a processor;
memory in electronic communication with the processor;
instructions stored in the memory, the instructions being executable by the processor to:
receive a channel quality indicator scheduling message from a base station;
generate a channel quality indicator-only feedback payload; and
transmit the channel quality indicator-only feedback payload on a physical uplink shared channel using up to a requested number of physical resource blocks included in the channel quality indicator scheduling message, wherein the requested number of physical resource blocks is set within a physical resource block maximum, wherein the physical resource block maximum is set to a value greater than four when an aperiodic channel quality indicator report mode is configured, or when multi-carrier aperiodic channel quality indicator reporting is supported.

19. The wireless device of claim 18, wherein the wireless device is a wireless communication device.

20. The wireless device of claim 18, wherein the channel quality indicator-only feedback payload is transmitted using quadrature phase shift keying modulation when a modulation and coding scheme index in the channel quality indicator scheduling message is set to 29 and the channel quality indicator scheduling message was transmitted using downlink control information format 0.

21. The wireless device of claim 18, wherein the channel quality indicator-only feedback payload is transmitted using 16 quadrature amplitude modulation when a modulation and coding scheme index in the channel quality indicator scheduling message is set to 31 and the channel quality indicator scheduling message was transmitted using downlink control information format 0.

22. The wireless device of claim 18, wherein the channel quality indicator-only feedback payload is transmitted using quadrature phase shift keying modulation when a rank of uplink transmission is equal to 1, a first modulation and coding scheme index in the channel quality indicator scheduling message is set to 29 and the channel quality indicator scheduling message was transmitted using downlink control information format 4.

23. The wireless device of claim 18, wherein the channel quality indicator-only feedback payload is transmitted using 16 quadrature amplitude modulation when a rank of uplink transmission is equal to 1, a first modulation and coding scheme index in the channel quality indicator scheduling message is set to 31 and the channel quality indicator scheduling message was transmitted using downlink control information format 4.

24. The wireless device of claim 18, wherein the channel quality indicator-only feedback payload is transmitted using quadrature phase shift keying modulation on all layers when a rank of uplink transmission is greater than 1, a first modulation and coding scheme index in the channel quality indicator scheduling message is set to 29, a second modulation and coding scheme index in the channel quality indicator scheduling message is set to 29 and the channel quality indicator scheduling message was transmitted using downlink control information format 4.

25. The wireless device of claim 18, wherein the channel quality indicator-only feedback payload is transmitted using the requested number of physical resource blocks in the channel quality indicator scheduling message.

26. A base station configured for scheduling a channel quality indicator-only feedback payload, comprising:
a processor;
memory in electronic communication with the processor;
instructions stored in the memory, the instructions being executable by the processor to:
begin generating a channel quality indicator scheduling message;
determine whether quadrature phase shift keying modulation or 16 quadrature amplitude modulation is required for the channel quality indicator-only feedback payload;
set a modulation and coding scheme index according to whether the quadrature phase shift keying modulation or the 16 quadrature amplitude modulation is required for the channel quality indicator-only feedback payload;
set a requested number of physical resource blocks of the channel quality indicator-only feedback payload within a physical resource block maximum, wherein the physical resource block maximum is set to a value greater than four when an aperiodic channel quality indicator report mode is configured, or when multi-carrier aperiodic channel quality indicator reporting is supported; and
transmit the channel quality indicator scheduling message to a wireless communication device.

27. The base station of claim 26, wherein the channel quality indicator scheduling message is transmitted on a physical downlink control channel.

28. The base station of claim 26, wherein the channel quality indicator scheduling message is transmitted using downlink control information format 0, wherein the quadrature phase shift keying modulation is required for the channel quality indicator-only feedback payload, and wherein the modulation and coding scheme index is set to 29.

29. The base station of claim 26, wherein the channel quality indicator scheduling message is transmitted using downlink control information format 0, wherein the 16 quadrature amplitude modulation is required for the channel quality indicator-only feedback payload, and wherein the modulation and coding scheme index is set to 31.

30. The base station of claim 26, wherein the channel quality indicator scheduling message is transmitted using downlink control information format 4, and wherein the instructions are further executable to determine whether a rank of the channel quality indicator-only feedback payload is greater than one.

31. The base station of claim 30, wherein the rank of the channel quality indicator-only feedback payload is one, wherein the quadrature phase shift keying modulation is required for the channel quality indicator-only feedback payload, and wherein a first modulation and coding scheme index is set to 29.

32. The base station of claim 30, wherein the rank of the channel quality indicator-only feedback payload is one, wherein the 16 quadrature amplitude modulation is required for the channel quality indicator-only feedback payload, and wherein a first modulation and coding scheme index is set to 31.

33. The base station of claim 30, wherein the rank of the channel quality indicator-only feedback payload is greater than one, wherein the quadrature phase shift keying is required for the channel quality indicator-only feedback payload, wherein a first modulation and coding scheme index is set to 29, and wherein a second modulation and coding scheme index is set to 29.

34. The base station of claim 33, wherein the instructions are further executable to set the requested number of physical resource blocks of the channel quality indicator-only feedback payload to a value less than or equal to four.

35. The base station of claim 26, wherein the instructions are further executable to set the physical resource block maximum to a value greater than four when a system bandwidth configuration is greater than 5 megahertz.

36. A wireless device configured for transmitting a channel quality indicator-only feedback payload, comprising:
means for receiving a channel quality indicator scheduling message from a base station;
means for generating a channel quality indicator-only feedback payload; and
means for transmitting the channel quality indicator-only feedback payload on a physical uplink shared channel using up to a requested number of physical resource blocks included in the channel quality indicator scheduling message, wherein the requested number of physical resource blocks is set within a physical resource block maximum, wherein the physical resource block maximum is set to a value greater than four when an aperiodic channel quality indicator report mode is configured, or when multi-carrier aperiodic channel quality indicator reporting is supported.

37. A base station configured for scheduling a channel quality indicator-only feedback payload, comprising:
- means for determining whether quadrature phase shift keying modulation or 16 quadrature amplitude modulation is required for the channel quality indicator-only feedback payload;
- means for setting a modulation and coding scheme index according to whether the quadrature phase shift keying modulation or the 16 quadrature amplitude modulation is required for the channel quality indicator-only feedback payload;
- means for setting a requested number of physical resource blocks of the channel quality indicator-only feedback payload within a physical resource block maximum, wherein the physical resource block maximum is set to a value greater than four when an aperiodic channel quality indicator report mode is configured, or when multi-carrier aperiodic channel quality indicator reporting is supported; and
- means for transmitting the channel quality indicator scheduling message to a wireless communication device.

38. A computer-program product for transmitting a channel quality indicator-only feedback payload, the computer-program product comprising a non-transitory computer-readable medium having instructions thereon, the instructions comprising:
- code for causing a wireless device to receive a channel quality indicator scheduling message from a base station;
- code for causing the wireless device to generate a channel quality indicator-only feedback payload; and
- code for causing the wireless device to transmit the channel quality indicator-only feedback payload on a physical uplink shared channel using up to a requested number of physical resource blocks included in the channel quality indicator scheduling message, wherein the requested number of physical resource blocks is set within a physical resource block maximum, wherein the physical resource block maximum is set to a value greater than four when an aperiodic channel quality indicator report mode is configured, or when multi-carrier aperiodic channel quality indicator reporting is supported.

39. A computer-program product for scheduling a channel quality indicator-only feedback payload, the computer-program product comprising a non-transitory computer-readable medium having instructions thereon, the instructions comprising:
- code for causing a base station to begin generating a channel quality indicator scheduling message;
- code for causing the base station to determine whether quadrature phase shift keying modulation or 16 quadrature amplitude modulation is required for the channel quality indicator-only feedback payload;
- code for causing the base station to set a modulation and coding scheme index according to whether the quadrature phase shift keying modulation or the 16 quadrature amplitude modulation is required for the channel quality indicator-only feedback payload;
- code for causing the base station to set a requested number of physical resource blocks of the channel quality indicator-only feedback payload within a physical resource block maximum, wherein the physical resource block maximum is set to a value greater than four when an aperiodic channel quality indicator report mode is configured, or when multi-carrier aperiodic channel quality indicator reporting is supported; and
- code for causing the base station to transmit the channel quality indicator scheduling message to a wireless communication device.

\* \* \* \* \*